(12) United States Patent
Abraham et al.

(10) Patent No.: US 12,271,760 B2
(45) Date of Patent: Apr. 8, 2025

(54) CLUSTER IDENTIFIER REMAPPING FOR ASYMMETRIC TOPOLOGIES

(71) Applicant: Intel Corporation, Santa Clara, CA (US)

(72) Inventors: Vinit Mathew Abraham, Hillsboro, OR (US); Anand K. Enamandram, Folsom, CA (US); Eswaramoorthi Nallusamy, Cedar Park, TX (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 17/477,470

(22) Filed: Sep. 16, 2021

(65) Prior Publication Data

US 2022/0004439 A1 Jan. 6, 2022

(51) Int. Cl.
*G06F 9/50* (2006.01)
*G06F 9/30* (2018.01)
*G06F 9/4401* (2018.01)
*G06F 13/42* (2006.01)

(52) U.S. Cl.
CPC ........ *G06F 9/5066* (2013.01); *G06F 9/30101* (2013.01); *G06F 9/4406* (2013.01); *G06F 13/4221* (2013.01); *G06F 2213/0026* (2013.01)

(58) Field of Classification Search
CPC .. G06F 9/5066; G06F 9/30101; G06F 9/4406; G06F 13/4221; G06F 2213/0026
See application file for complete search history.

(56) References Cited

U.S. PATENT DOCUMENTS

| | | | |
|---|---|---|---|
| 9,626,321 B2 | 4/2017 | Safranek et al. | |
| 2014/0006714 A1* | 1/2014 | Cherukuri | G06F 12/0817 711/128 |
| 2016/0188519 A1* | 6/2016 | Wagh | G06F 13/4265 710/105 |
| 2020/0242042 A1* | 7/2020 | Svennebring | G06F 12/0877 |
| 2020/0301830 A1* | 9/2020 | Mathew Abraham | G06F 13/4027 |
| 2021/0374057 A1* | 12/2021 | Barner | G06F 12/0813 |

* cited by examiner

*Primary Examiner* — Nimesh G Patel
(74) *Attorney, Agent, or Firm* — Alliance IP, LLC

(57) ABSTRACT

A first plurality of integrated circuit blocks of a first chip are connected to a second plurality of integrated circuit blocks of a second chip. A cluster remapping table is provided on the second chip and is to be programmed to identify a desired asymmetric topology of the connections between the first plurality of integrated circuit blocks and the second plurality of integrated circuit blocks. Logic is to discover the actual topology of the connections between the first plurality of integrated circuit blocks and the second plurality of integrated circuit blocks and determine whether the actual topology matches the desired topology as described in the cluster remapping table.

20 Claims, 13 Drawing Sheets

CLUSTER IDENTIFIER REMAPPING FOR ASYMMETRIC TOPOLOGIES

FIELD

This disclosure pertains to computing systems, and in particular (but not exclusively) to cache coherent interconnects to couple multi-socket systems.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

DETAILED DESCRIPTION

Figure 1:
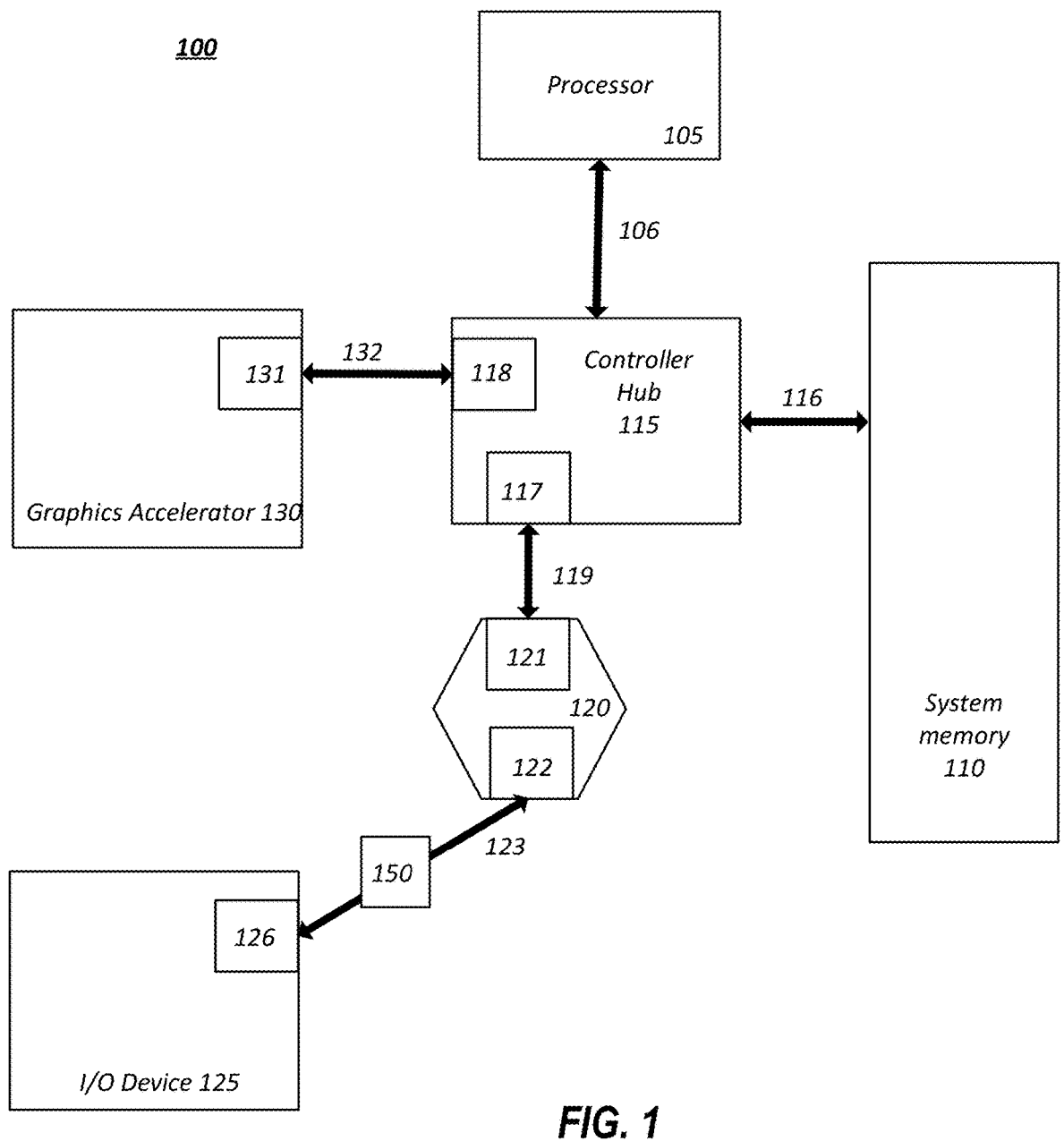
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the solutions provided in the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the solutions described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105. Further, one or more links (e.g., 123) of the system can include one or more extension devices (e.g., 150), such as retimers, repeaters, etc.

Figure 2:
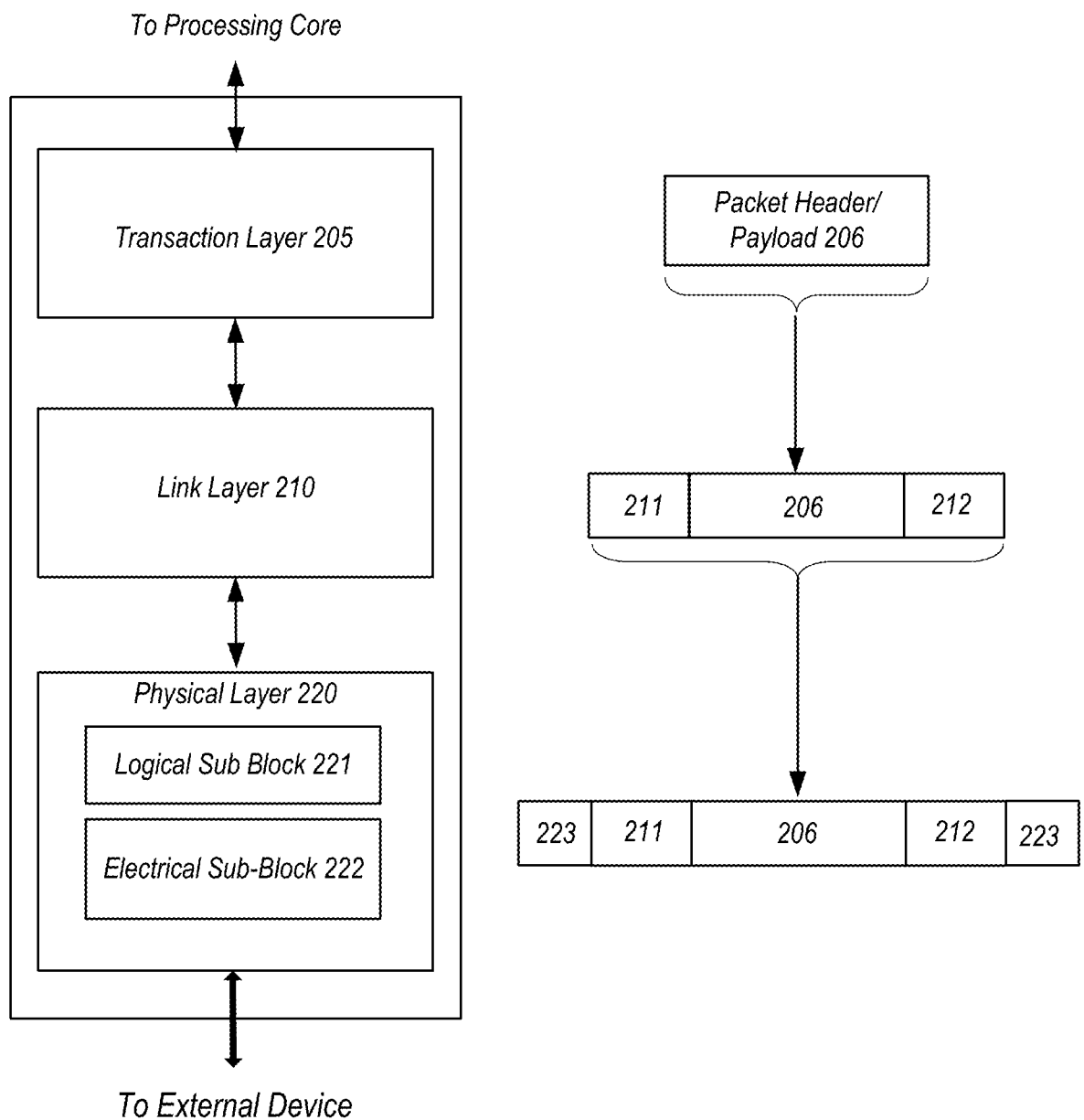
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCIe stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Figure 3:
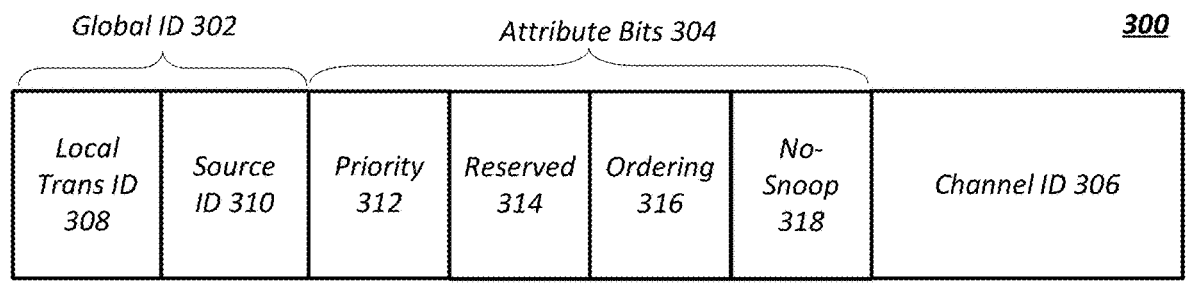
FIG. 3 illustrates an embodiment of a request or packet to be generated or received within an interconnect architecture.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 4:
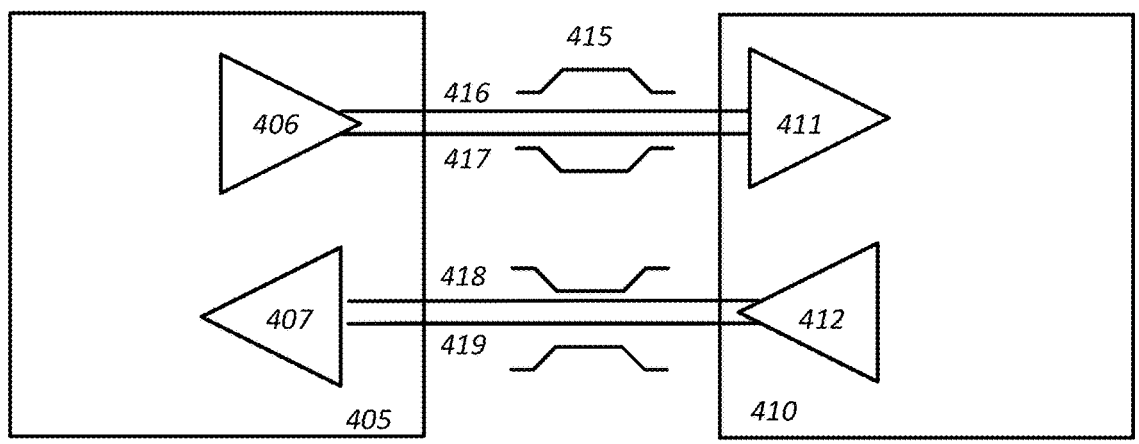
FIG. 4 illustrates an embodiment of a transmitter and receiver pair for an interconnect architecture.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

In one embodiment, Ultra Path Interconnect™ (UPI™) may be utilized to interconnect two or more devices. UPI can implement a next-generation cache-coherent, link-based interconnect. As one example, UPI may be utilized in high performance computing platforms, such as workstations or servers, including in systems where PCIe or another interconnect protocol is typically used to connect processors, accelerators, I/O devices, and the like. However, UPI is not so limited. Instead, UPI may be utilized in any of the systems or platforms described herein. Furthermore, the individual ideas developed may be applied to other interconnects and platforms, such as PCIe, MIPI, QPI, etc.

Figure 5:
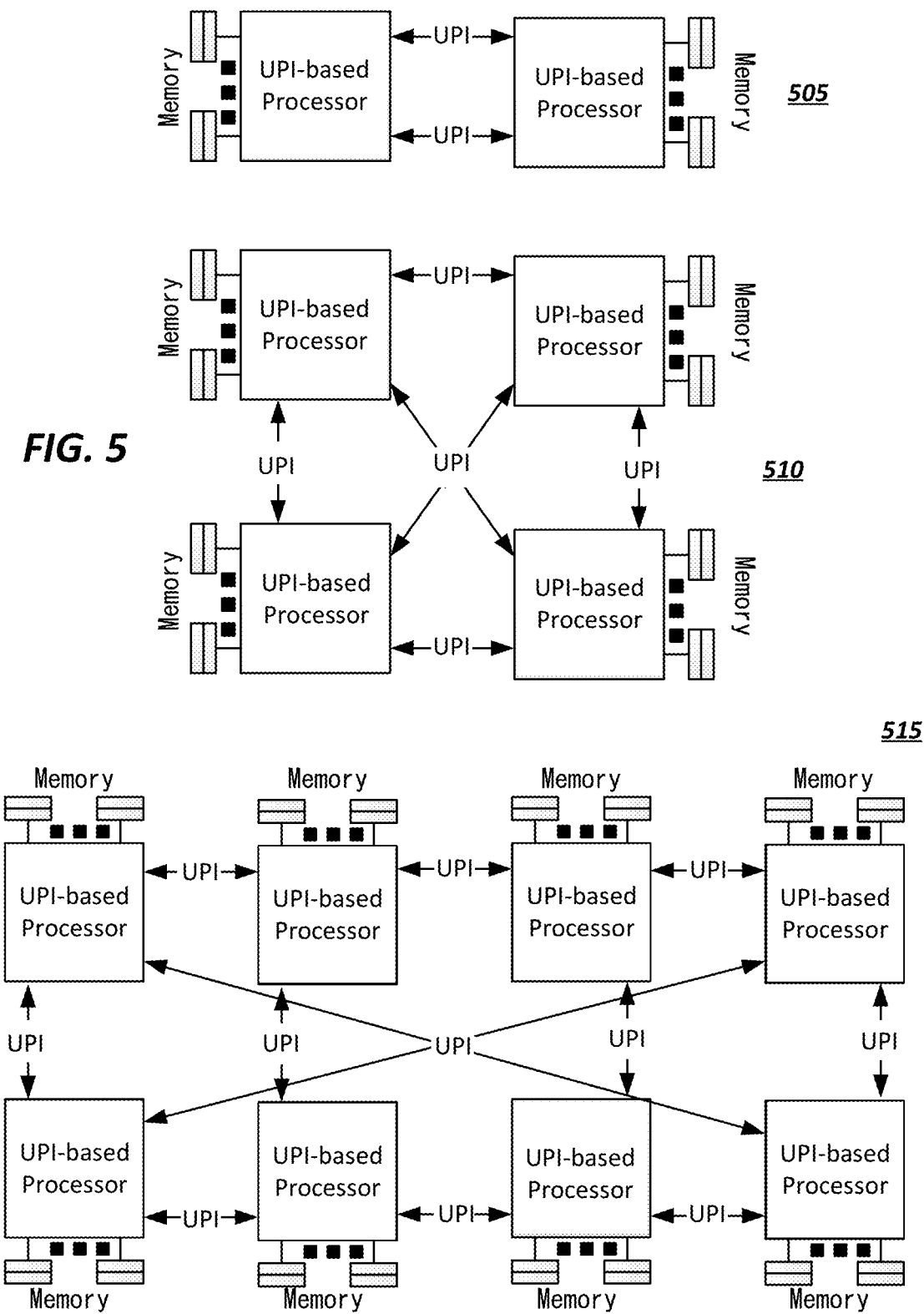
FIG. 5 illustrates embodiments of potential high performance, processor-to-processor interconnect configurations.

To support multiple devices, in one example implementation, UPI can include an Instruction Set Architecture (ISA) agnostic (i.e. UPI is able to be implemented in multiple different devices). In another scenario, UPI may also be utilized to connect high performance I/O devices, not just processors or accelerators. For example, a high performance PCIe device may be coupled to UPI through an appropriate translation bridge (i.e. UPI to PCIe). Moreover, the UPI links may be utilized by many UPI based devices, such as processors, in various ways (e.g. stars, rings, meshes, etc.). FIG. 5 illustrates example implementations of multiple potential multi-socket configurations. A two-socket configuration 505, as depicted, can include two UPI links; however, in other implementations, one UPI link may be utilized. For larger topologies, any configuration may be utilized as long as an identifier (ID) is assignable and there is some form of virtual path, among other additional or substitute features. As shown, in one example, a four socket configuration 510 has an UPI link from each processor to another. But in the eight socket implementation shown in configuration 515, not every socket is directly connected to each other through an UPI link. However, if a virtual path or channel exists between the processors, the configuration is supported. A range of supported processors includes 2-32 in a native domain. Higher numbers of processors may be reached through use of multiple domains or other interconnects between node controllers, among other examples.

The UPI architecture includes a definition of a layered protocol architecture, including in some examples, protocol layers (coherent, non-coherent, and, optionally, other memory based protocols), a routing layer, a link layer, and a physical layer. Furthermore, UPI can further include enhancements related to power managers (such as power control units (PCUs)), design for test and debug (DFT), fault handling, registers, security, among other examples. FIG. 5 illustrates an embodiment of an example UPI layered protocol stack. In some implementations, at least some of the layers illustrated in FIG. 5 may be optional. Each layer deals with its own level of granularity or quantum of information (the protocol layer 620*a,b* with packets 630, link layer 610*a,b* with flits 635, and physical layer 605*a,b* with phits 640). Note that a packet, in some embodiments, may include partial flits, a single flit, or multiple flits based on the implementation.

As a first example, a width of a phit 640 includes a 1 to 1 mapping of link width to bits (e.g. 20 bit link width includes a phit of 20 bits, etc.). Flits may have a greater size, such as 184, 192, or 200 bits. Note that if phit 640 is 20 bits wide and the size of flit 635 is 184 bits then it takes a fractional number of phits 640 to transmit one flit 635 (e.g. 9.2 phits at 20 bits to transmit an 184 bit flit 635 or 9.6 at 20 bits to transmit a 192 bit flit, among other examples). Note that widths of the fundamental link at the physical layer may vary. For example, the number of lanes per direction may include 2, 4, 6, 8, 10, 12, 14, 16, 18, 20, 22, 24, etc. In one embodiment, link layer 610*a,b* is capable of embedding multiple pieces of different transactions in a single flit, and one or multiple headers (e.g. 1, 2, 3, 4) may be embedded within the flit. In one example, UPI splits the headers into corresponding slots to enable multiple messages in the flit destined for different nodes.

Physical layer 605*a,b*, in one embodiment, can be responsible for the fast transfer of information on the physical medium (electrical or optical etc.). The physical link can be point-to-point between two Link layer entities, such as layer 605*a* and 605*b*. The Link layer 610*a,b* can abstract the Physical layer 605*a,b* from the upper layers and provides the capability to reliably transfer data (as well as requests) and manage flow control between two directly connected entities. The Link Layer can also be responsible for virtualizing the physical channel into multiple virtual channels and message classes. The Protocol layer 620*a,b* relies on the Link layer 610*a,b* to map protocol messages into the appropriate message classes and virtual channels before handing them to the Physical layer 605*a,b* for transfer across the physical links. Link layer 610*a,b* may support multiple messages, such as a request, snoop, response, writeback, non-coherent data, among other examples.

Figure 6:
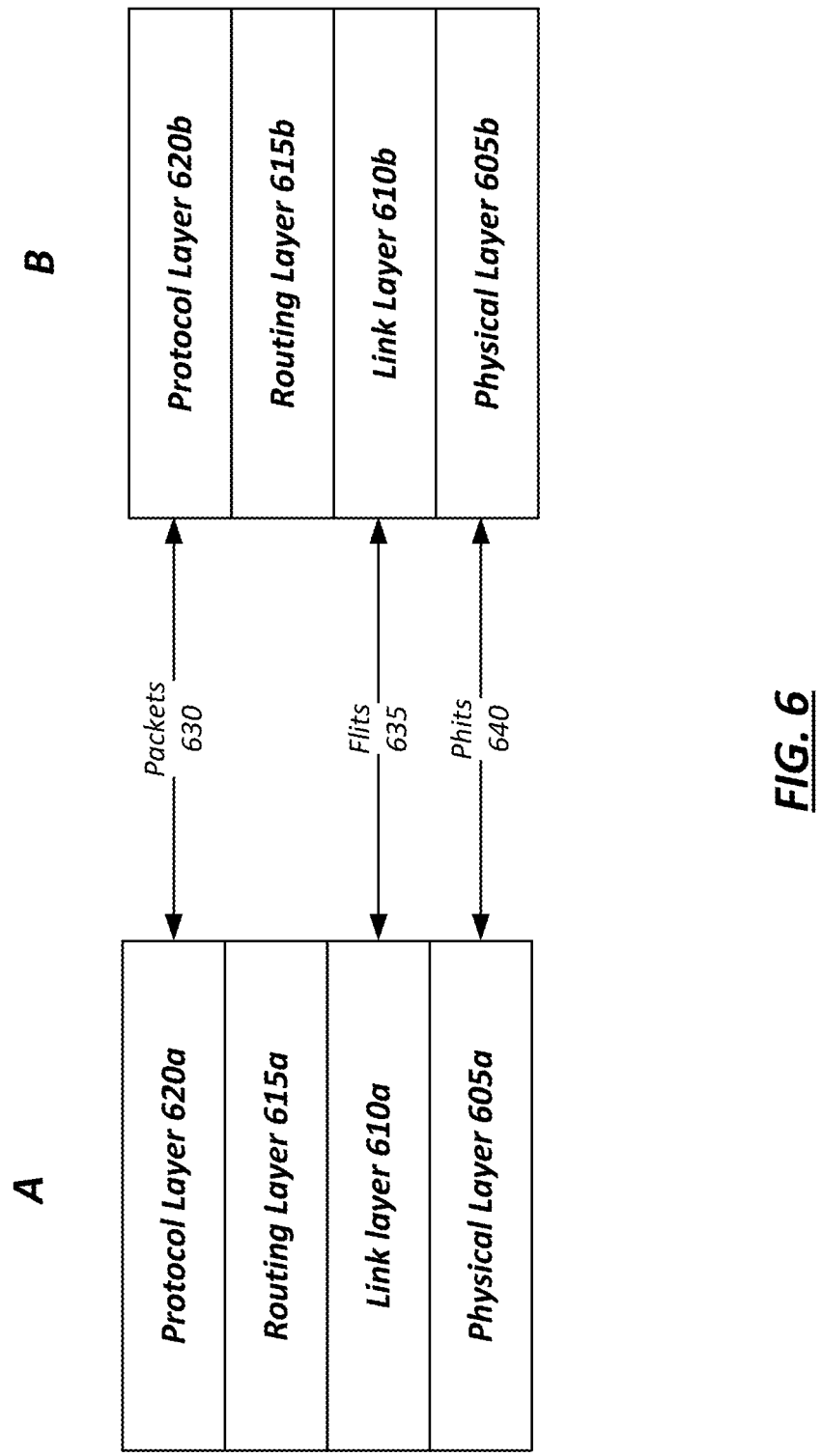
FIG. 6 illustrates an embodiment of a layered protocol stack associated with an interconnect.

The Physical layer 605*a,b* (or PHY) of UPI can be implemented above the electrical layer (i.e. electrical conductors connecting two components) and below the link layer 610*a,b*, as illustrated in FIG. 6. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 605*a,b*, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer. The initialization phase includes minor phases e.g. Polling, Configuration. The operation phase also includes minor phases (e.g. link power management states).

In one embodiment, Link layer 610a,b can be implemented so as to provide reliable data transfer between two protocol or routing entities. The Link layer can abstract Physical layer 605a,b from the Protocol layer 620a,b, and can be responsible for the flow control between two protocol agents (A, B), and provide virtual channel services to the Protocol layer (Message Classes) and Routing layer (Virtual Networks). The interface between the Protocol layer 620a,b and the Link Layer 610a,b can typically be at the packet level. In one embodiment, the smallest transfer unit at the Link Layer is referred to as a flit which a specified number of bits, such as 192 bits or some other denomination. The Link Layer 610a,b relies on the Physical layer 605a,b to frame the Physical layer's 605a,b unit of transfer (phit) into the Link Layer's 610a,b unit of transfer (flit). In addition, the Link Layer 610a,b may be logically broken into two parts, a sender and a receiver. A sender/receiver pair on one entity may be connected to a receiver/sender pair on another entity. Flow Control is often performed on both a flit and a packet basis. Error detection and correction is also potentially performed on a flit level basis.

In one embodiment, Routing layer 615a,b can provide a flexible and distributed method to route UPI transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a UPI packet into the UPI fabric. The lookup at an intermediate router may be used to route an UPI packet from an input port to an output port. The lookup at a destination port may be used to target the destination UPI protocol agent. Note that the Routing layer, in some implementations, can be thin since the routing tables, and, hence the routing algorithms, are not specifically defined by specification. This allows for flexibility and a variety of usage models, including flexible platform architectural topologies to be defined by the system implementation. The Routing layer 615a,b relies on the Link layer 610a,b for providing the use of up to three (or more) virtual networks (VNs)—in one example, two deadlock-free VNs, VN0 and VN1 with several message classes defined in each virtual network. A shared adaptive virtual network (VNA) may be defined in the Link layer, but this adaptive network may not be exposed directly in routing concepts, since each message class and virtual network may have dedicated resources and guaranteed forward progress, among other features and examples.

In one embodiment, UPI can include a Coherence Protocol layer 620a,b to support agents caching lines of data from memory. An agent wishing to cache memory data may use the coherence protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request. Lastly, an agent may fulfill external requests to invalidate a line in its cache. The protocol ensures coherency of the data by dictating the rules all caching agents may follow. It also provides the means for agents without caches to coherently read and write memory data.

Two conditions may be enforced to support transactions utilizing the UPI Coherence Protocol. First, the protocol can maintain data consistency, as an example, on a per-address basis, among data in agents' caches and between those data and the data in memory. Informally, data consistency may refer to each valid line of data in an agent's cache representing a most up-to-date value of the data and data transmitted in a coherence protocol packet can represent the most up-to-date value of the data at the time it was sent. When no valid copy of the data exists in caches or in transmission, the protocol may ensure the most up-to-date value of the data resides in memory. Second, the protocol can provide well-defined commitment points for requests. Commitment points for reads may indicate when the data is usable; and for writes they may indicate when the written data is globally observable and will be loaded by subsequent reads. The protocol may support these commitment points for both cacheable and uncacheable (UC) requests in the coherent memory space.

The UPI Coherence Protocol also may ensure the forward progress of coherence requests made by an agent to an address in the coherent memory space. Certainly, transactions may eventually be satisfied and retired for proper system operation. The UPI Coherence Protocol, in some embodiments, may have no notion of retry for resolving resource allocation conflicts. Thus, the protocol itself may be defined to contain no circular resource dependencies, and implementations may take care in their designs not to introduce dependencies that can result in deadlocks. Additionally, the protocol may indicate where designs are able to provide fair access to protocol resources.

Logically, the UPI Coherence Protocol, in one embodiment, can include three items: coherence (or caching) agents, home agents, and the UPI interconnect fabric connecting the agents. Coherence agents and home agents can work together to achieve data consistency by exchanging messages over the interconnect. The link layer 610a,b and its related description can provide the details of the interconnect fabric including how it adheres to the coherence protocol's requirements, discussed herein. (It may be noted that the division into coherence agents and home agents is for clarity. A design may contain multiple agents of both types within a socket or even combine agents behaviors into a single design unit, among other examples.)

In one embodiment, home agents can be configured to guard physical memory. Each home agent can be responsible for a region of the coherent memory space. Regions may be non-overlapping, in that a single address is guarded by one home agent, and together the home agent regions in a system cover the coherent memory space. For instance, each address can be guarded by at least one home agent. Therefore, in one embodiment, each address in a UPI system's coherent memory space can map to exactly one home agent.

Home agents in the UPI Coherence Protocol, in one embodiment, can be responsible for servicing requests to the coherent memory space. For read (Rd) requests, home agents may generate snoops (Snp), process their responses, send a data response, and send a completion response. For invalidation (Inv) requests, home agents may generate necessary snoops, process their responses, and send a completion response. For write requests, home agents may commit the data to memory and send a completion response.

Home agents may provide snoops in the UPI Coherence Protocol and process snoop responses from coherence agents. Home agents can also process forward requests, which are a special snoop response, from coherence agents for conflict resolution. When a home agent receives a forward request, it may send a forward response to the coherence agent that generated the forward request (i.e., the agent that detected a conflicting snoop request). Coherence agents can use the ordering of these forward responses and completion responses from the home agent to resolve conflicts.

A coherence agent may issue supported coherence protocol requests. Requests may be issued to an address in the coherent memory space. Data received for read requests (Rd) except RdCur may be consistent. Data for RdCur requests may have been consistent when the data packet was generated (although it may have become out of date during delivery). Table 1 shows an exemplary, non-exhaustive list of potential supported requests:

UPI can support a Coherency protocol making use of principles of the MESI protocol. Each cache line can be marked with one or more supported states (e.g., coded in the cache line). A "M" or "Modified" state can indicate that the cache line value has been modified from that value which is in main memory. A line in the M-state is only present in the particular cache and the corresponding cache agent can be required to write the modified data back to memory at some time in the future, for instance, before permitting any other read of the (no longer valid) line. A writeback can transition the line from the M-state to the E-state. The "E" or "Exclusive" state can indicate that the cache line is only present in the current cache but that its value matches that in main memory. The cache line in E-state can transition to the S-state at any time in response to a read request or may be changed to the M-state by writing to the line. The "S" or "Shared" state can indicates that the cache line may be stored in other caches of the machine and has a value that matches that of the main memory. The line may be discarded (changed to the I-state) at any time. The "I" or "Invalid" state can indicate that a cache line is invalid or unused. Other state can also supported in UPI, such as an "F" or "Forward" shared state that indicates that the particular shared line value is to be forwarded to other caches that are to also share the line, among other examples.

Table 2 include exemplary information that can be included in some Coherence protocol messages, including snoop, read, and write requests, among other examples:

TABLE 1

| Name | Semantics | Cache State |
|---|---|---|
| RdCode | Request a cache line in F or S state. | F or S |
| RdData | Request a cache line in E, F, or S state. | F or S |
| RdMigr | Request a cache line in M, E, F, or S state. | M and (F or S) |
| RdInv | Request a cache line in E state. If line was previously cached in M state, the line will be written to memory before E data is delivered. | E |
| RdInvOwn | Request a cache line in M or E state. | M |
| RdCur | Request an uncacheable snapshot of a cache line. | |
| InvItoE | Request exclusive ownership of a cache line without receiving data. | M or E |
| InvItoM | Request exclusive ownership of a cache line without receiving data and with the intent of performing a writeback soon afterward. | M or E |
| InvXtoI | Flush a cache line from all caches. Requesting agent is to invalidate the line in its cache before issuing this request. | |
| WbMtoI | Write a cache line in M state back to memory and invalidate the line in the cache. | M |
| WbMtoS | Write a cache line in M state back to memory and transition line to S state. | M and S |
| WbMtoE | Write a cache line in M state back to memory and transition line to E state. | M and E |
| WbMtoIPtl | Write a cache line in M state back to memory, according to a byte-enable mask, and transition line to I state. | M |
| WbMtoEPtl | Write a cache line in M state back to memory, according to a byte-enable mask, transition line to E state, and clear the line's mask in the cache. | M and E |
| EvctCln | Notification to home agent that a cache line in E state was invalidated in the cache. | E |
| WbPushMtoI | Send a line in M state to home agent and invalidate the line in the cache; home agent may either write the line back to memory or send it to a local cache agent with M state. | M |
| WbFlush | Request that home flush writes to implementation-specific addresses in its memory hierarchy. No data is sent with the request. | |

TABLE 2

| Field | Usage |
|---|---|
| cmd | Message command (or name or opcode). |
| addr | Address of a coherent cache line. |
| destNID | Node ID (NID) of destination (home or coherence) agent. |
| reqNID | ND of requesting coherence agent. |
| peerNID | ND of coherence agent that sent the (forward request) message. |
| reqTID | ID of the resource allocated by the requesting agent for the transaction, also known as RTID (or requesting transaction identifier). |
| homeTID | ID of the resource allocated by the home agent to process the request, also known as HTID (or home transaction identifier). |
| data | A cache line of data. |
| mask | Byte mask to qualify the data. |

Snoop messages may be generated by home agents and directed toward coherence agents. A snoop (SNP) virtual channel can be used for snoops and, in one embodiment, are the only messages that use the SNP virtual channel. Snoops can include the requesting agent's NID and the RTID it allocated for the request in case the snoop results in data being sent directly to the requesting agent. Snoops, in one embodiment, can also include the HTID allocated by the home agent to process the request. The coherence agent processing the snoop may include the HTID in the snoop response it sends back to the home agent. Snoops may, in some instance, not include the home agent's NID because it may be derived from the included address, which the targeted coherence agent does when sending its response. Fanout snoops (those with "SnpF" prefix) may not include a destination NID because the Routing Layer is responsible for generating the appropriate snoop messages to all peers in the fanout region. An exemplary list of snoop channel messages is listed Table 3:

UPI may also support non snoop requests that they may issue to an address, such as those implemented as non-coherent requests. Examples of such requests can include a non-snoop read to request a read-only line form memory, a non-snoop write to write a line to memory, and a write a line to memory according to a mask, among other potential examples.

In one example, four general types of response messages can be defined in the UPI Coherence Protocol: data, completion, snoop, and forward. Certain data messages can carry an additional completion indication and certain snoop responses can carry data. Response messages may use the RSP virtual channel, and the communication fabric may maintain proper message delivery ordering among ordered completion responses and forward responses.

Table 4 includes a listing of at least some potential response messages supported by an example UPI Coherence Protocol:

TABLE 3

| Command | Semantics | Fields |
|---|---|---|
| SnpCode | Snoop to get data in F or S state. | cmd, |
| SnpData | Snoop to get data in E, F, or S state. | addr, |
| SnpMigr | Snoop to get data in M, E, F, or S state. | destNID, |
| SnpInv | Snoop to invalidate the peer's cache, flushing any M copy to memory. | reqNID, reqTID, |
| SnpInvOwn | Snoop to get data in M or E state. | homeTID |
| SnpCur | Snoop to get an uncacheable snapshot of a cache line. | |
| SnpFCode | Snoop to get data in F or S state; Routing layer to handle distribution to all fanout peers | cmd, addr, |
| SnpFData | Snoop to get data in E, F, or S state; Routing layer to handle distribution to all fanout peers | reqNID, reqTID, |
| SnpFMigr | Snoop to get data in M, E, F, or S state; Routing layer to handle distribution to all fanout peers | homeTID |
| SnpFInvOwn | Snoop to get data in M or E state; Routing layer to handle distribution to all fanout peers. | |
| SnpFInv | Snoop to invalidate the peer's cache, flushing any M copy to memory; Routing layer to handle distribution to all fanout peers. | |
| SnpCur | Snoop to get an uncacheable snapshot of a cache line; Routing layer to handle distribution to all fanout peers. | |

TABLE 4

| Name | Semantics | Fields |
|---|---|---|
| Data_M | Data is M state. | cmd, |
| Data_E | Data is E state. | destNID, |
| Data_F | Data is F state. | reqTID, |
| Data_SI | Depending upon request, data in S state or uncacheable "snapshot" data. | data |
| Data_M | Data is M state with an ordered completion response. | |
| Data_E | Data is E state with an ordered completion response. | |
| Data_F | Data is F state with an ordered completion response. | |
| Data_SI | Depending upon request, data in S state or uncacheable "snapshot" data, with an ordered completion response. | |
| CmpU | Completion message with no ordering requirements. | cmd, |
| CmpO | Completion message to be ordered with forward responses. | destNID, reqTID |
| RspI | Cache is in I state. | cmd, |
| RspS | Cache is in S state. | destNID, |
| RspFwd | Copy of cache line was sent to requesting agent, cache state did not change. | homeTID |
| RspFwdI | Copy of cache line was sent to requesting agent, cache transitions to I state. | |
| RspFwdS | Copy of cache line was sent to requesting agent, cache transitions to S state. | |
| RspIWb | Modified line is being implicitly written back to memory, cache was transitioned to I state. | cmd, destNID, |
| RspSWb | Modified line is being implicitly written back to memory, cache was transitioned to S state. | homeTID, data |
| RspFwdIWb | Modified line is being implicitly written back to memory, copy of cache line was sent to requesting agent, cache was transitioned to I state. | |
| RspFwdSWb | Modified line is being implicitly written back to memory, copy of cache line was sent to requesting agent, cache was transitioned to S state. | |
| RspCnflt | Peer has an outstanding request to same address, is requesting an ordered forward response, and has allocated a resource for the forward. | cmd, destNID, homeTID, peerNID |

In one example, data responses can target a requesting coherence agent. A home agent may send any of the data responses. A coherence agent may send only data responses not containing an ordered completion indication. Additionally, coherence agents may be limited to sending data responses only as a result of processing a snoop request. Combined data and completion responses may always be of the ordered-completion type and can be kept ordered with forward responses by the communication fabric.

The UPI Coherence Protocol can uses the general unordered completion message and a coherence-specific ordered completion message. A home agent may send completion responses to coherent requests and completion responses can be typically destined for a coherence agent. The ordered completion response can be kept ordered with forward responses by the communication fabric.

Snoop responses may be sent by coherence agents, specifically in response to processing a snoop request, and target the home agent handling the snoop request. The destNID is usually a home agent (determined from the address in the snoop request) and the included TID is for the home agent's resource allocated to process the request. Snoop responses with "Wb" in the command are for implicit writebacks of modified cache lines, and they carry the cache line data. (Implicit writebacks can include those a coherence agent makes due to another agent's request, whereas the other requests are made explicitly by the coherence agent using its request resources.)

Coherence agents can generate a forward request when a snoop request conflicts with an outstanding request. Forward requests target the home agent that generated the snoop, which is determined from the address in the snoop request. Thus, the destNID is a home agent. The forward request can also include the TID for the home agent's resource allocated to process the original request and the NID of the coherence agent generating the forward request The UPI Coherence Protocol can support a single forward response, FwdCnfltO. Home agents can send a forward response for every forward request received and to the coherence agent in the forward request's peerNID field. Forward responses carry the cache line address so the coherence agent can match the message to the forward resource it allocated. Forward response message can carry the requesting agent's NID but, in some cases, not the requesting agent's TID. If a coherence agent wants to support cache-to-cache transfers for forward responses, it can save the requesting agent's TID when processing the snoop and send a forward request. To support conflict resolution, the communication fabric may maintain ordering between the forward response and all ordered completions sent before it to the same destination coherence agent.

In some systems, home agent resources are pre-allocated in that "RTIDs" represent resources in the home agents and the caching agents allocate RTIDs from system-configured pools when generating new coherence requests. Such schemes can limit the number of active requests any particular caching agent can have to a home agent to the number of RTIDs it was given by the system, effectively slicing up home resources statically among caching agents. Such schemes can result inefficient allocation of resources and properly sizing a home agent to support request throughput can become impractical for large systems, among other potential issues. For instance, such schemes can force RTID pool management upon the caching agents. Additionally, in some systems, a caching agent may not reuse the RTID until the home agent has completely processed the transaction.

Waiting until a home agent completes all processing, however, can unnecessarily throttle caching agents. Additionally, certain flows in the protocol can involve caching agents holding onto RTIDs beyond the home agent release notification, further throttling their performance, among other issues.

In one implementation, home agents can be allowed to allocate their resources as requests arrive from cache agents. In such instances, home agent resource management can be kept separate from coherence agent logic. In some implementations, home resource management and coherence agent logic can be at least partially intermingled. In some instances, coherence agents can have more outstanding requests to a home agent than the home agent can simultaneously handle. For instance, UPI can allow requests to queue up in the communication fabric. Further, to avoid deadlocks caused by the home agent blocking incoming requests until resources become available, the UPI Coherence protocol can be configured to ensure that other messages can make progress around blocked requests to ensure that active transactions reach completion.

In one example, resource management can be supported by allowing an agent receiving a request to allocate resources to process it, the agent sending the request allocating respective resources for all responses to the request The HTID can represent the resource that a home agent allocates for a given request included in some protocol messages. The HTID (along with RNID/RTID) in snoop requests and forward responses can be used to support responses to a home agent as well as data forwarding to a requesting agent, among other examples. Further, UPI can support the ability of an agent to send an ordered complete (CmpO) early, that is, before the home agent is finished processing the request, when it is determined to be safe for a requesting agent to reuse its RTID resource. General handling of snoops with similar RNID/RTID can also be defined by the protocol.

Figure 7:
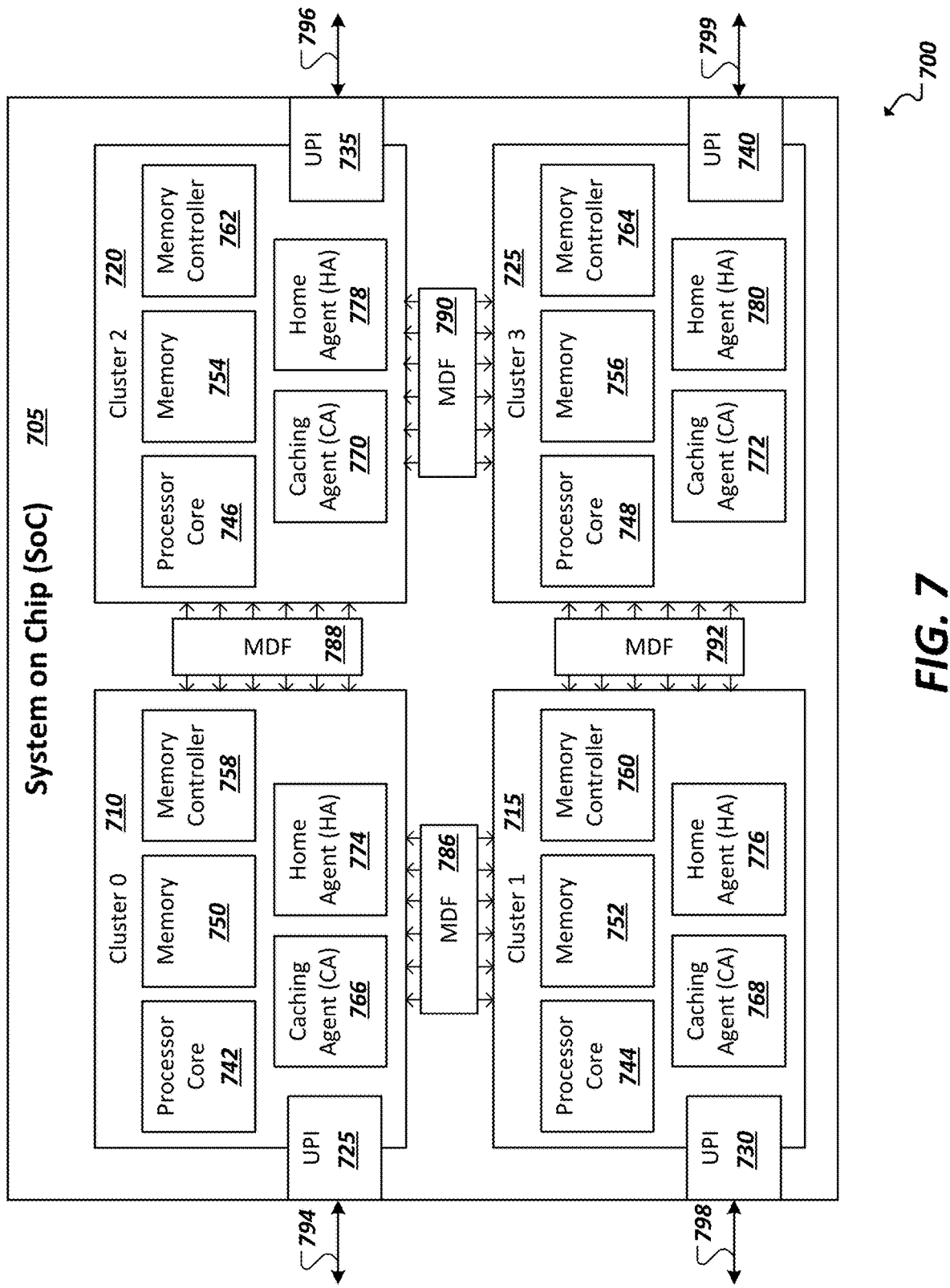
FIG. 7 illustrates a simplified block diagram of an example chip including multiple integrated circuit blocks.

FIG. 7 is a simplified block diagram illustrating an example system on chip (SoC) 705. A computing board may be implemented with sockets to electrically couple (and potentially also mechanically couple) the pins or leads of the SoC to the board. Within this disclosure a "socket" may refer generally to any chip (e.g., a SoC, processor chip (e.g., CPU), or other chip) that is capable of connecting to a board socket. In some sockets, such as SoC 705, multiple processing clusters (e.g., 710, 715, 720, 725), which may be interconnected by an on-SoC fabric, such as through multi-die fabric links (e.g., 786, 788, 790, 792). Such interconnects may be high-speed utilizing standard or proprietary low-latency protocols to enable fast transfer of data between the clusters (e.g., 710, 715, 720, 725). In some implementations, clusters may include one or more processor cores (e.g., 742, 744, 746, 748). Cluster (e.g., 710, 715, 720, 725) may additionally include memory blocks (e.g., 750, 752, 754, 756), at least a portion of which may be utilized to implement shared memory on the SoC 705. Memory controllers (e.g., 758, 760, 762, 764) to control access to data in these memory blocks (e.g., 750, 752, 754, 756). To implement cache coherent memory management and access to cache lines (e.g., of L2 or L3 cache) within these memory blocks (e.g., 750, 752, 754, 756), clusters (e.g., 710, 715, 720, 725) may additionally include caching agent logic (e.g., implemented in hardware of the cluster and/or associated firmware). Such agents may include caching agents (e.g., 766, 768, 770, 772) and home agents (e.g., 774, 776, 778, 780), such as agents defined by UPI or another cache coherent interconnect protocol.

In multi-socket platforms, each single socket chip (e.g., SoC 705) may interconnect with other socket chips connected to the same board, blade, rack unit, or other computing framework. To enable affinitization and other example features and benefits, some sockets (e.g., 705) may be equipped with multiple socket-to-socket communication ports (e.g., 794, 796, 798, 799), which enable individual clusters (e.g., 710, 715, 720, 725) in the socket (e.g., 705) to couple to communicate with clusters on other sockets on the platform. For instance, each port may implement a protocol stack of a cache-coherent interconnect (e.g., UPI, IBM™ POWERAXON™, AMD™ Infinity Fabric™, NVIDIA™ Nvlink™, etc.) through which cache coherent transactions and communications may be completed, effectively allowing all of the local cluster memory of the sockets on the platform to function as shared memory. In the example shown in FIG. 7, multiple clusters on a socket may be provided with such ports to allow the multiple clusters to couple to multiple other clusters on a neighboring socket. This allows for multiple points of connection and data flows between the sockets to assist in minimizing the amount of traffic required to flow over the socket's multi-die fabric (e.g., 786, 788, 790, 792) when a cluster on one socket transacts with another cluster on another socket. For instance, in the specific example of FIG. 7, were only a single port (e.g., 725) provided to couple the clusters 710, 715, 720, 725 of socket 705 with clusters of another neighboring socket (not shown), if a request from the other socket were to request access to the resources (e.g., memory and/or processing capabilities) of Cluster 3 725, data corresponding to the request (and response if needed), would need to pass over at least two "hops" of the multi-die fabric (e.g., MDF 786 and 792 or 788 and 790). Any such traffic competes with the internal cluster-to-cluster traffic of the socket reducing the available bandwidth on the fabric (and potentially resulting in expensive performance degradation of the socket (e.g., 705). Affinitization refers to creating a logical association between any two agents (e.g., statically or dynamically at run-time) in cache coherent systems, where such associations are intended to yield a latency or similar performance benefit. For instance, affinitization may be employed to define a logical association between the caching agent and a home agent in a remote socket. Accordingly, affinitization pertains to the realization that multiple socket-to-socket ports, positioned in the correct locations/clusters, may allow minimization of socket-to-socket traffic on a socket's internal multi-die fabric. For instance, the four ports (e.g., 725, 730, 735, 740) of the simplified example of FIG. 7 could enable affinitization to minimize traffic from socket-to-socket transactions clogging the internal cluster-to-cluster fabric of SoC 705, among examples.

In some interconnect protocols and architectures, including coherent interconnects such as UPI, may utilize or even include a presumption or requirement for affinitization to reduce cross-socket access latencies in multi-socket systems by minimizing redundant inter-die interconnect crossings within each socket (e.g., Multi-Die Fabric Interconnect (MDFI) crossings). Affinitization may traditionally require that clusters on one chip are to be connected to other clusters on other chips such that the cluster identifiers of the connected clusters match. For instance, the baseline UPI affinitization feature may designate a fixed symmetric UPI topology (e.g., matching IDs), thereby making affinitization incompatible with the variety of asymmetric topologies that might be desirable or appropriate for various board designs. In an improved system, affinitization may be supported in a multi-slot system for any arbitrary topology, including in systems utilizing protocols (e.g., UPI) where affinitization rules are tailored to symmetric topologies only, among other example applications and benefits.

In some implementations, the assignment of identifiers to various integrated circuit blocks (or clusters) within an SoC or other chip-based system (or socket) may be fixed, for instance, at manufacturing time. In an improved system, such as described herein, remapping structures may be defined (and potentially redefined during runtime) to allow substitute or alias cluster IDs to be defined and assigned dynamically from boot-to-boot based on the platform UPI topology to allow clusters in a multi-socket system to be connected (asymmetrically) when their respective identifiers do not match.

An "asymmetric" topology or connection is one where links coupling clusters on different sockets are connected to differently numbered Cluster ID's between sockets. For example, Cluster 0 of a socket may be connected to a different cluster ID (such as Cluster 2 (rather than Cluster 0)) of its peer socket. As platform designers and vendors may desire to be able to design asymmetric topologies (e.g., UPI topologies) in their platforms for various benefits and application, remapping functionality provided in an improved system may be utilized to realize such topologies while preserving traditional benefits of affinitization (even in technologies (e.g., UPI) where asymmetric affinitization may not be supported). Among the benefits, asymmetric topologies may allow for different form factors—such as Spread Core (e.g., for better air flow) or Shadow Core (e.g., for better rack density), allow lower trace lengths on the board to enable operation at higher link speeds with improved performance, and reduce layer count (e.g., by consolidating traces connecting the sockets to a single board layer) and improve platform bill of materials (BOM) costs (e.g., in cost sensitive platform designs, asymmetric UPI topologies could reduce layer count, resulting in lower platform BOM cost), among other example benefits. Preserving affinitization allows such solutions to additionally take advantage of the performance benefits of affinitization (e.g., reducing cross-socket latencies, improving TPCE Server benchmark scores, etc.), among other example benefits. For instance, to achieve a logical connection between the same cluster IDs of the sockets and preserve functionality, a remapping of the cluster IDs may be defined in one of the sockets using such remapping features. In one example, cluster IDs may be remapped for an asymmetrically connected multi-socket topology during boot time using firmware assistance, among other example implementations.

Figure 8A:
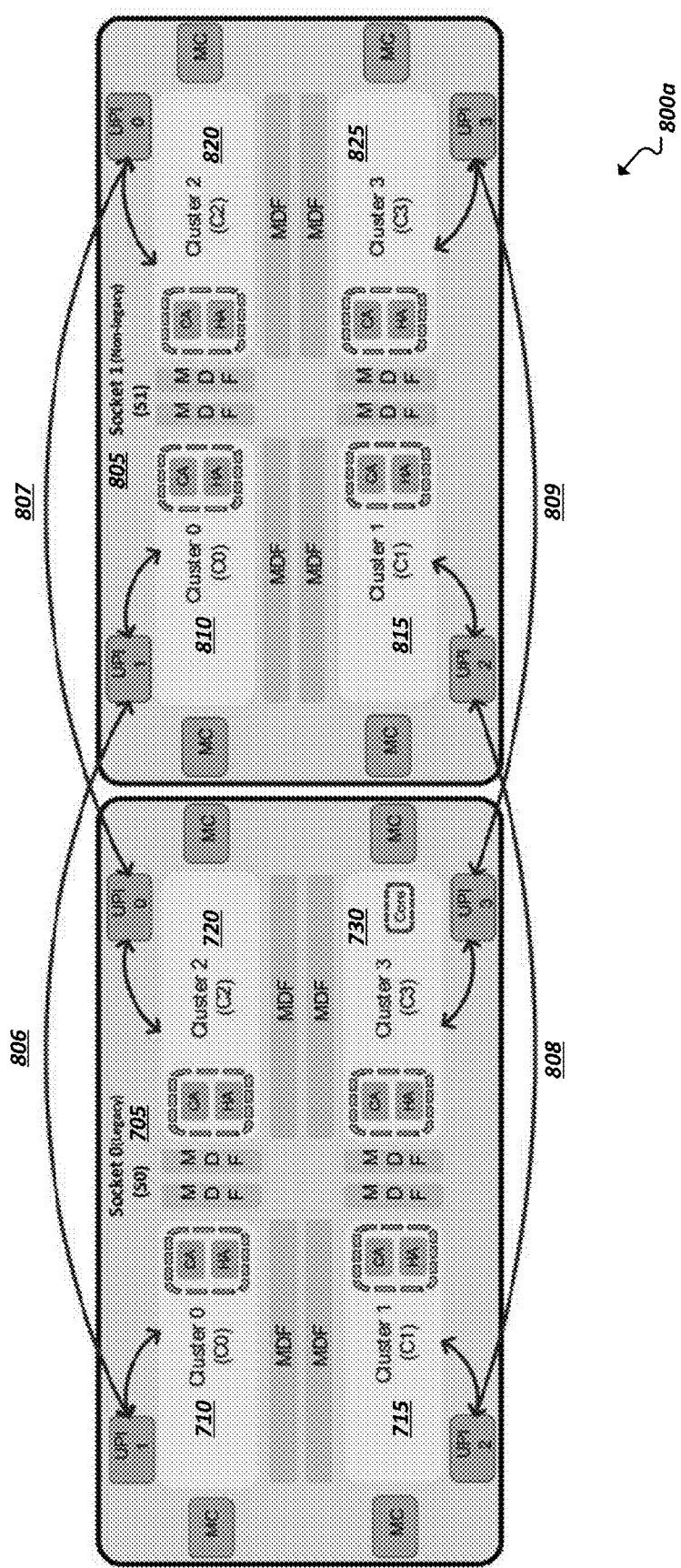
FIGS. 8A-8B are simplified block diagrams illustrating connections between integrated circuit blocks on different chips.

Turning to FIG. 8A, a simplified block diagram 800a is shown illustrating at least a portion of a multi-socket computing platform is shown. Sockets of the example platform include a first socket (e.g., 705) and a second socket (e.g., 805) coupled in a symmetric manner, where clusters of the first socket are connected to corresponding clusters (e.g., clusters having a matching identifier) on the other second socket (e.g., through links 806, 807, 808, 809). As introduced above, in some systems, the base or default affinitization case may assume symmetric connection (such as shown in FIG. 8A), whereby a given cluster ID on Socket 0 is connected to the exact same cluster ID on Socket 1. In this example, the clusters (C0 710, C1 715, C2 720, C3 725) of socket S0 705 are connected to the clusters (e.g., C0 810, C1 815, C2 820, C3 825) of socket S1 805 as follows: S0 C0⇔S1 C0, S0 C1⇔S1 C1, S0 C2⇔S1 C2, S0 C3⇔S1 C3. This particular topology may be denoted "00-11-22-33", where the digits indicate connected clusters on S0/S1 respectively. As this symmetrical topology satisfies the assumption for this system (e.g., as a UPI system) that like cluster IDs are coupled with like cluster IDs, no remapping of cluster IDs is performed.

Figure 8B:
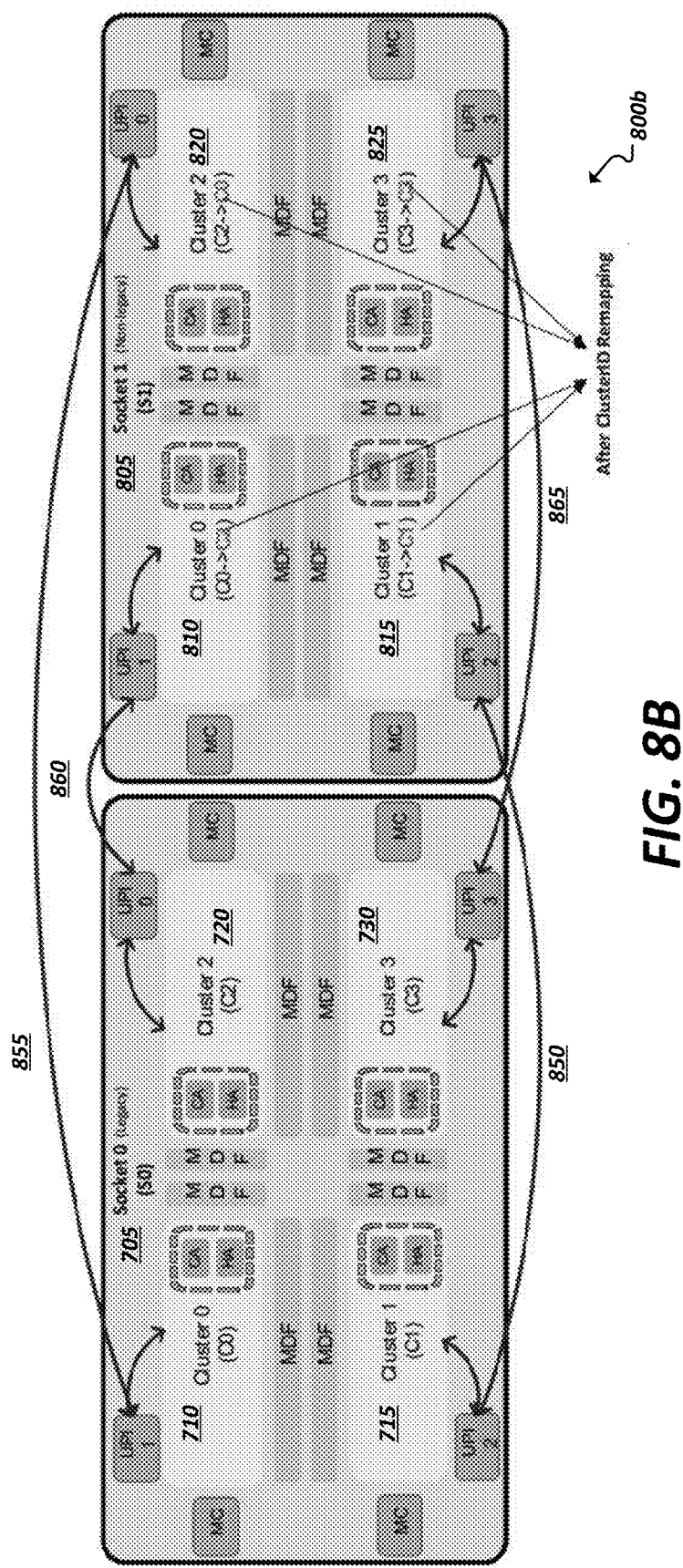

FIG. 8B is a simplified block diagram 800b showing an asymmetric topology implemented using the same socket chips (e.g., 705, 805) illustrated in the example of FIG. 8B. In an asymmetric topology, such as illustrated in FIG. 8B, at least some of the clusters are connected to clusters on the other socket that have different cluster IDs across sockets. For instance, in the example asymmetric topology shown in FIG. 8B, the connections are as follows: S0 C0⇔S1 C2, S0 C1⇔S1 C1, S0 C2⇔S1 C0, S0 C3⇔S1 C3 (where S=Socket, C=Cluster). The topology may be denoted by "02-11-20-33" where the digits indicate connected cluster IDs on sockets S0 and S1 respectively. It should be appreciated that even for this two-socket, eight-cluster simplified example, many other combinations of asymmetric topologies are possible. In more complex systems, the various alternative asymmetric topologies may be even more complex. However, by allowing such asymmetry, a myriad of additional alternative topologies are made available to system designers where (in cases of assumed symmetry), such flexibility was severely limited.

As introduced above, in asymmetric connections, clusters which are connected between the sockets have different Cluster IDs. In some implementations, however, the system may nonetheless assume that all connections are actually symmetric. In such instances, to have the same clusters logically connected between the two sockets, a remapping of the cluster IDs is utilized on one of the sockets in order to allow for asymmetric connections to function properly. This remapping allows the actually asymmetric connections to present to the system (e.g., system software) as symmetric. To function properly, this cluster ID remapping is performed in a controlled environment when there is no mesh traffic and may be performed at boot time or otherwise prior to the sending/receiving of traffic by clusters within or between the sockets of a multi-socket platform, among other example configurations and features.

In one example, a board may be designed based on an assumption that two chips (e.g., SoCs, network on chips (NOCs), machine learning chip, etc.) will be connected asymmetrically. A remapping table structure (e.g., stored on one of the chips or elsewhere on the board) may be written to indicate the asymmetric connection(s). At boot time or after reset (and before traffic resumes on the system, which might result in traffic between the two chips) firmware of the board and/or the two or more chips may access the remapping table structure to determine how the chips are intended to be connected. In some implementations, separate firmware or software (e.g., BIOS) may utilize configuration data to cause the remapping table to be programmed with values defined in or based on the configuration data. A value in the remapping table may indicate whether the connection is symmetric or asymmetric. If asymmetric, the remapping table may further indicate how the connection is asymmetric (e.g., specifying at least the asymmetric connections)). The remapping table may effectively define an alias for two or more clusters (and/or ports associated with the two or more clusters) on the asymmetrically connected chip to allow the cluster IDs of two connected clusters to "appear" as though they share the same cluster ID (when, in fact, their assigned or original cluster IDs (e.g., defined during manufacturing) do not. The system may then attempt to successfully train the links connecting the clusters of the different chips assuming that the connections defined in the remapping table correctly represent the actual physical connections. If the training is successful, the remapping table may additionally be used, for instance, to assist in routing of data between clusters among other example uses. In the event that link training fails based on a determination that the remapping table incorrectly represents the actual physical connections, firmware or system software may cause the remapping table to be rewritten to instead reflect the connections as discovered by the firmware or system software (e.g., BIOS) during the attempted training. The training may then be retried based on the re-written values in the remapping table and, if the next attempt at training is successful, may be used to assist in routing of data between clusters (e.g., as native routing rules or protocols may assume a symmetric connection based on the assigned cluster IDs of the connected clusters, etc.), among other example uses.

To illustrate, in the example of FIG. 8B, if the remapping table indicated that Cluster 1 715 of Socket 0 705 is connected to Cluster 3 825 of Socket 1 805, during training of link 850, training of the link 850 will ultimately fail as Cluster 1 715 is instead connected to Cluster 1 815 of Socket 1. A BIOS may identify the error and further identify that Cluster 1 715 is instead connected to Cluster 1 815 of Socket 1 (S0 C1⇔S1 C1) and rewrite the remapping table from 02-13-20-31 to 02-11-20-33 to reflect the actual topology of the platform (including links 850, 855, 860, 865, etc.).

In some implementations, a remapping table may be defined for only one of the two or more asymmetrically connected sockets. As BIOS (or other software or firmware) may determine cluster-to-cluster mapping between sockets from a single remapping table, providing more than one remapping table may be redundant.

Figure 9:
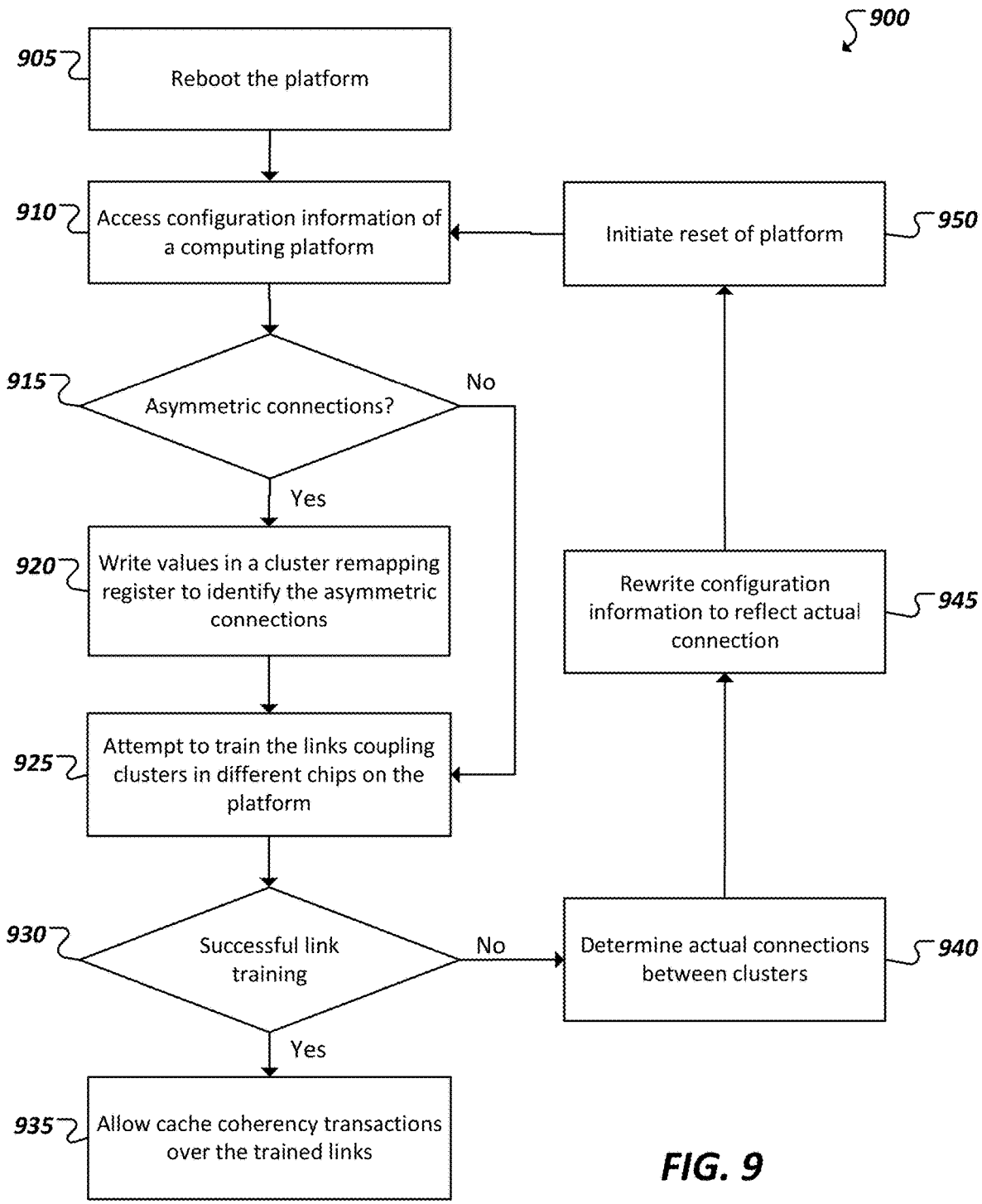
FIG. 9 is a flowchart illustrating example techniques for programming a cluster remapping register.

FIG. 9 is a flow diagram 900 illustrating an example flow performed by firmware, hardware, and/or software of a computing platform including two or more sockets whose clusters are connected either symmetrically or asymmetrical to affinitize transactions of a cache coherency protocol involving cache implemented at the clusters. The platform may be reboot or reset (e.g., 905) and data stored in rewritable, persistent memory (e.g., flash) and potentially also fuse data (or other permanent, write-protected storage), may be accessed 910 to identify configuration parameters of the platform, including configuration parameters for the fabric connecting the sockets. Data stored in rewritable memory may identify configuration parameters indicating whether inter-socket cluster connections are symmetric or asymmetric (at 915). If the configuration parameters identify that the inter-socket cluster connections are symmetric, the platform (e.g., through its BIOS or other system software or firmware) may initiate training 925 of the inter-socket cluster links in accordance with the corresponding interconnect protocol (e.g., UPI). If training is successful (at 930) this indicates that the configuration data's indication of the platform topology, including inter-socket cluster connections, was correct.

If configuration data indicates that asymmetric cluster connections are to exist in the platform, values may be written 920 into a cluster remapping register located on one of the sockets to program the cluster remapping register to indicate the cluster IDs of the asymmetric connections. Training of the corresponding links may be attempted 925 based on the information in the cluster remapping register. During training, the system may determine if the cluster remapping register correctly indicates the actual connections of the clusters between sockets. If the cluster remapping register does not correctly reflect the actual connections, link training will fail. The determined actual connections (at 940) may be used as the basis for rewriting the configuration information to indicate the cluster IDs in the actual connections in association with a reset of the platform 950, in which the platform tries again (and potentially writes the corrected values in the cluster remap register) to successfully train the links and enable (at 935) cache coherency transactions to be successfully communicated between the clusters on different sockets over the trained links.

Figure 10:
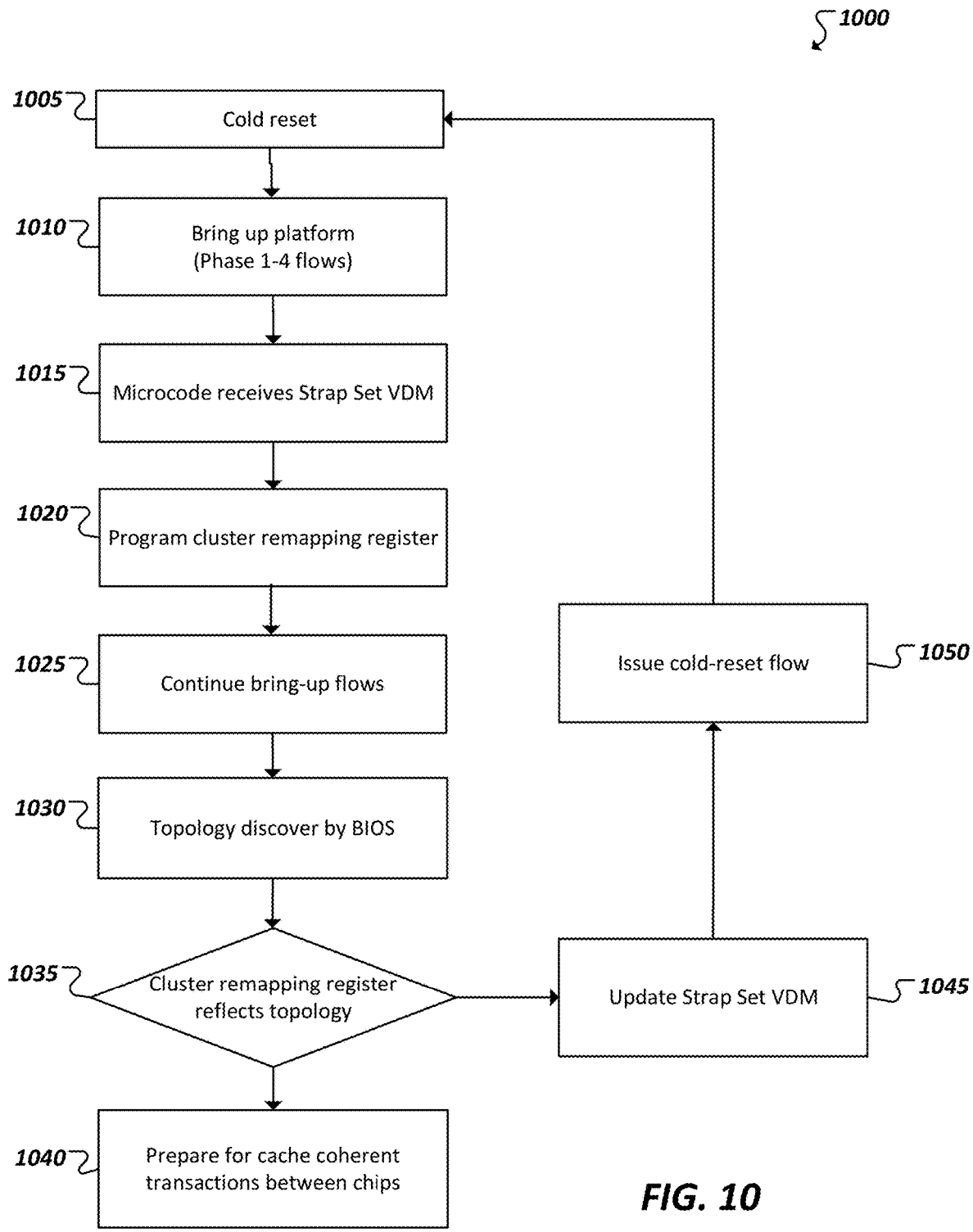
FIG. 10 is a flowchart illustrating another example for programming a cluster remapping register.

FIG. 10 is another flow diagram 1000 illustrating a particular embodiment of the generalized flow illustrated in FIG. 9. For instance, a platform and its constituent sockets (e.g., SoC devices) may be brought up from a cold reset 1005. This "bring up" procedure may be defined to include multiple phases as various aspects of the platform and the sockets are prepared to function (e.g., in connection with a boot phase or reboot of the platform, among other example events that may trigger a reset). Such phases may include phases 1010, which are to be performed before transactions begin to execute (e.g., according to an example cache coherency protocol (e.g., UPI) and corresponding data is transmitted between the sockets. For instance, such introductory phases may include the power supply being brought up at the socket level and various configuration data (e.g., fuse data) may be accessed. Microcontrollers on the platform, which are configured to assist in bringing up the various devices and subsystems of the platform may be powered up to facilitate activation, including power management units and other hardware-implemented logic. Microcode may begin to execute (e.g., pcode) and may receive or otherwise access configuration information identifying the connections between clusters on different sockets of the platform. For instance, in one implementation, a vendor defined message (VDM), or other message defined in the platform may be utilized to deliver configuration information to firmware or microcode (e.g., pcode). The microcode may receive 1015 this VDM and may utilize the configuration information included in the VDM to program 1020 a program cluster remapping register, for instance, to indicate whether such cluster connections between sockets are symmetric or asymmetric, and if asymmetric, what connections are made (and what cluster ID remappings need to be defined to comply with affinitization rules established for the platform and protocols (e.g., UPI) utilizing these connections.

In some implementations, dedicated CPU Soft Strap Bits (e.g., customer-controlled platform configuration metadata) may be provisioned (e.g., in memory outside of the socket boundaries (e.g., in flash memory or BIOS persistent variables, etc.)) that indicate the customer-desired socket-to-socket connection topology at boot time. The soft strap bits may be accessed and used to program the cluster identifier remapping table structure (e.g., by firmware resident on the same socket). For instance, these configuration "soft strap" bits may be programmed in platform SPI flash to be later consumed by pcode during early reset. As such, the values of these soft strap bits may be customer-selectable for each cold boot cycle, among other example implementations. A strap set Vendor Defined Message (VDM) may be used to delivers CPU Soft Strap Bit values corresponding to the desired UPI topology to pcode during early reset. A platform may choose to support symmetric, and/or one or multiple asymmetric topologies per customer needs, providing the desired flexibility.

As noted above, a cluster remapping register may be provided (e.g., stored in memory of) and used at only one of the sockets to which the cluster-to-cluster topology information applies. As a result, one of the connected sockets may be "legacy" in that it neither includes a cluster remapping register or the corresponding logic to access and utilize the information included in such a cluster remapping register, allowing this solution to be applied in potentially any system where one of the sockets includes such registers and corresponding functionality. For instance, pcode on the non-legacy socket may program the cluster remapping register based on the strap set VDM value received. Tables 5-7 illustrate example encodings that may be used in a strap set VDM and in cluster remapping registers in an example implementation.

TABLE 5

Sample Straps Encoding for UPI Affinitization Enabled/Disabled

| UPI_AFFINITY_ENABLE | Definition |
|---|---|
| 1'b0 | UPI_AFFINITY disabled |
| 1'b1 | UPI_AFFINITY enabled |

TABLE 6

Example Soft Straps Encodings for Symmetric and Asymmetric Connections

| UPI_AFFINITY | Corresponding Topology Definition |
|---|---|
| 2'b00 | 00-11-22-33 (Symmetric) |
| 2'b01 | 01-10-22-33 (Asymmetric) |
| 2'b10 | 01-10-23-32 (Asymmetric) |
| 2'b11 | 03-12-21-30 (Asymmetric) |

TABLE 7

Example Encodings for a Cluster ID Remapping Register

| Range | Access Type | Default (Reset) | Description |
|---|---|---|---|
| 8:8 | RW | 0 × 1 (reset) | CLUSTER_REMAP_VALID The Cluster Remap Table will be used by the HW only if the valid bit is set. |
| 7:6 | RW/P | 0 × 3 (prst) | CLUSTER3_REMAP_VALUE Pcode programs the remapped cluster ID value for Cluster 3. |
| 5:4 | RW/P | 0 × 2 (prst) | CLUSTER2_REMAP_VALUE Pcode programs the remapped cluster ID value for Cluster 2. |
| 3:2 | RW/P | 0 × 1 (prst) | CLUSTER1_REMAP_VALUE Pcode programs the remapped cluster ID value for Cluster |
| 1:0 | RW/P | 0 × 0 (prst) | CLUSTER0_REMAP_VALUE Pcode programs the remapped cluster ID value for Cluster 0. | where "RW" refers to rewritable access, "P" refers to a persistent or "sticky" register field that persists across a reset of the SoC, and "Prst" refers to a power good resent (e.g., indicating that the register field will go back default value when the SoC is issued Power Good Reset).

Continuing with the forgoing example, and applying the example encodings listed in Tables 5-7, were the strap set VDM value received as [2'b00], a Symmetric Connection is indicated (e.g., per Table 6), therefore, no pcode programming of the cluster remap register would be needed. However, if the strap set VDM value received is one of [2'b01, 2'b10, 2'b11], it indicates an Asymmetric Connection (e.g., per Table 6) and therefore pcode should update cluster remapping register instances (e.g., in the uncore) accordingly (e.g., using the corresponding encoding defined in Table 7), among other example implementations. Accordingly, pcode may only be tasked with programming (1020) the cluster remapping register when asymmetric connections are indicated (e.g., by the strap set VDM (or other message communicating the pre-set configuration for the platform's topology)).

Continuing with the flow of FIG. 10, for proper functionality of the platform, the cluster remapping register should be programmed to be strictly aligned with the actual UPI topology implemented. In one example implementation, to ensure this the platform's BIOS dynamically discovers the UPI topology 1030 and checks 1035 that the discovered topology matches the topology designated by the cluster remapping register by reading the cluster remapping register (e.g., as programmed by pcode). If a mismatch is detected, BIOS updates 1045 the Strap Set VDM with the correct encoding and reboots the system (e.g., initiating a cold reset (at 1005)). This cold reset step allows the system to reboot with the correct encoding for the Strap Set VDM matching the actual, observed UPI topology. Accordingly, in the subsequent early reset phase (e.g., second iteration), pcode will now correctly consume and re-program 1020 the cluster remapping register matching the actual topology discovered by BIOS (at 1030). Thereby, alignment is ensured at system level and the corresponding UPI links may be successfully trained (e.g., through assistance or direction by the BIOS) to enable 1040 cache coherent transactions between the sockets to proceed. This can be accomplished through the BIOS properly initializing the silicon to reflect the asymmetric connection, by affinitizing the Caching/Home Agents of the respective clusters, as well as the memory controller in a given cluster to use the UPI link connected to the same cluster in the remote socket, and completing the remaining initialization flows defined in the protocol.

Figure 11:
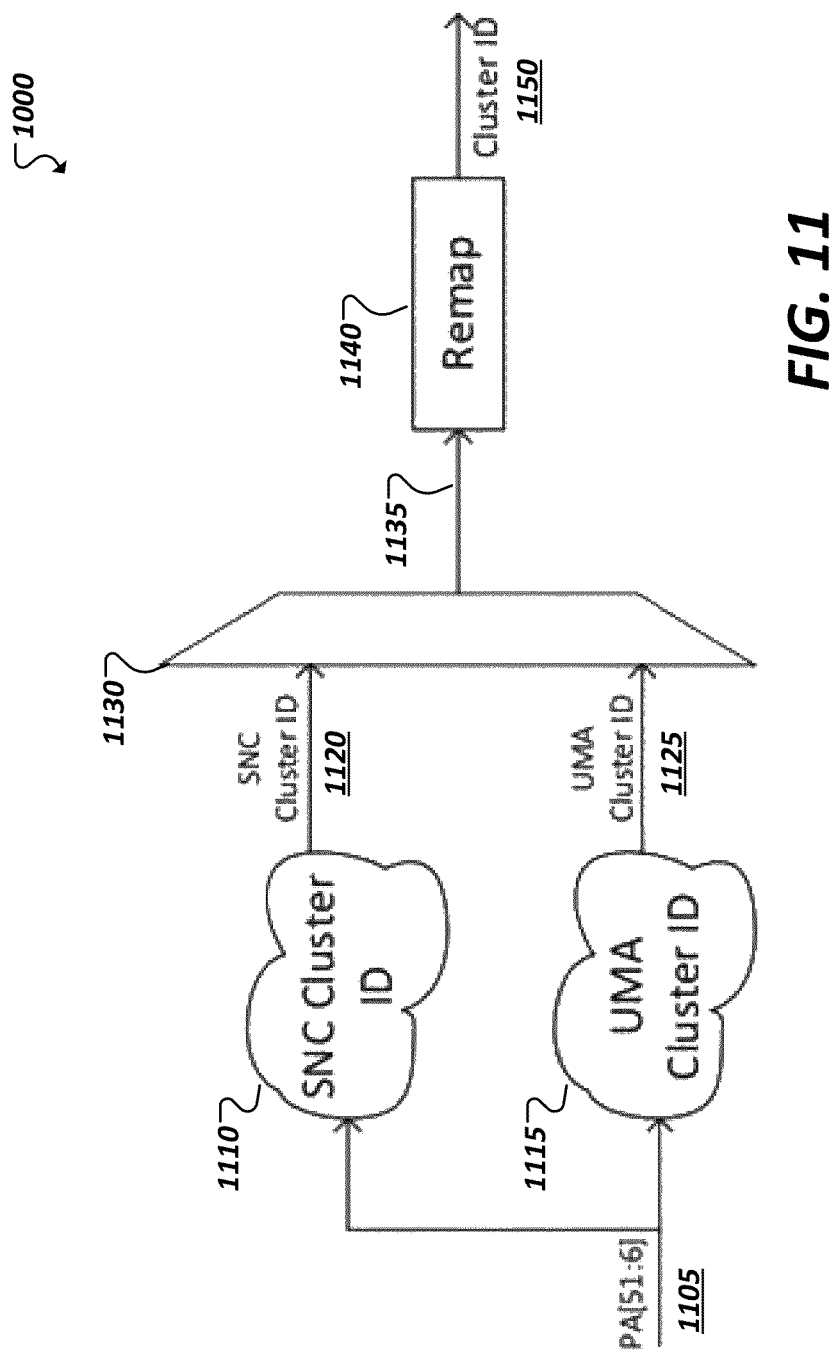
FIG. 11 is a simplified block diagram of illustrating example cluster identifier generation logic.

FIG. 11 is a simplified block diagram 1100 illustrating example logic, which may be utilized within a platform to convert or translate physical addresses 1105 to cluster identifiers (to enable proper routing of cache coherency transactions (requests, snoops, completions, etc.) between clusters on two different sockets, such as described herein. In some platforms, multiple different clustering protocols may be utilized. For instance, in the example of FIG. 11, both a sub-NUMA clustering (SNC) and uniform memory access (UMA) cluster identifier protocols may be supported and corresponding cluster identifier generation logic (for each protocol) 1110, 1115 may be provided. In this example, a physical address 1105 may be identified in a message (e.g., by the uncore) and the cluster ID generation logic 1110, 1115 may be utilized to generate corresponding cluster IDs (e.g., 1120, 1125) corresponding to the physical address 1105. Multiplexer logic 1130 may be used to select the appropriate cluster ID (e.g., from 1120 and 1125) to generate a selected cluster ID (at 1135). The cluster remapping register (and corresponding system logic) 1140 may translate the selected cluster ID 1135 into a resulting, translated cluster ID 1150 based on remapping defined in the cluster remapping register table (such as described in the examples above), to allow the transaction message to be properly routed to the correct cluster with an affinitization topology, among other examples.

Note that the apparatus', methods', and systems described above may be implemented in any electronic device or system as aforementioned. As specific illustrations, the figures below provide exemplary systems for utilizing the solutions as described herein. As the systems below are described in more detail, a number of different interconnects are disclosed, described, and revisited from the discussion above. While some of the examples above were based on UPI systems, it should be appreciated that the solutions and features discussed above may be just as readily applied to other cache coherent interconnects used to couples sockets, packages, boards, and the like within various computing platforms. As is readily apparent, the advances described above may be applied to any of the interconnects, fabrics, or architectures discussed herein, as well as other comparable interconnects, fabrics, or architectures not explicitly named or illustrated herein.

Figure 12:
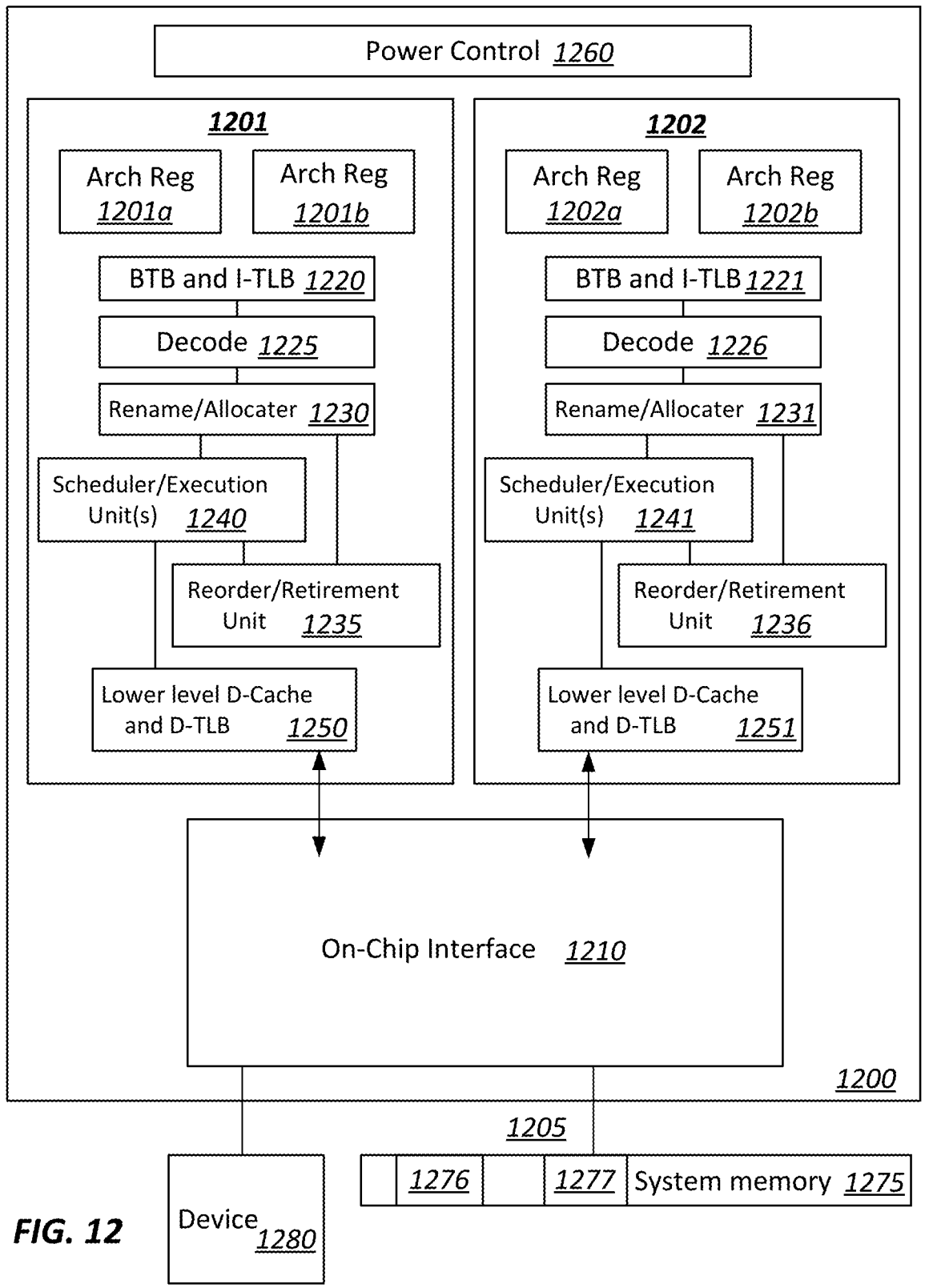
FIG. 12 illustrates an embodiment of a block diagram for a computing system including a multicore processor.

Referring to FIG. 12, an embodiment of a block diagram for a computing system including a multicore processor is depicted. Processor 1200 includes any processor or processing device, such as a microprocessor, an embedded processor, a digital signal processor (DSP), a network processor, a handheld processor, an application processor, a co-processor, a system on a chip (SOC), or other device to execute code. Processor 1200, in one embodiment, includes at least two cores—core 1201 and 1202, which may include asymmetric cores or symmetric cores (the illustrated embodiment). However, processor 1200 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1200, as illustrated in FIG. 12, includes two cores—core 1201 and 1202. Here, core 1201 and 1202 are considered symmetric cores, i.e. cores with the same configurations, functional units, and/or logic. In another embodiment, core 1201 includes an out-of-order processor core, while core 1202 includes an in-order processor core. However, cores 1201 and 1202 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1201 are described in further detail below, as the units in core 1202 operate in a similar manner in the depicted embodiment.

As depicted, core 1201 includes two hardware threads 1201a and 1201b, which may also be referred to as hardware thread slots 1201a and 1201b. Therefore, software entities, such as an operating system, in one embodiment potentially view processor 1200 as four separate processors, i.e., four logical processors or processing elements capable of executing four software threads concurrently. As alluded to above, a first thread is associated with architecture state registers 1201a, a second thread is associated with architecture state registers 1201b, a third thread may be associated with architecture state registers 1202a, and a fourth thread may be associated with architecture state registers 1202b. Here, each of the architecture state registers (1201a, 1201b, 1202a, and 1202b) may be referred to as processing elements, thread slots, or thread units, as described above. As illustrated, architecture state registers 1201a are replicated in architecture state registers 1201b, so individual architecture states/contexts are capable of being stored for logical processor 1201a and logical processor 1201b. In core 1201, other smaller resources, such as instruction pointers and renaming logic in allocator and renamer block 1230 may also be replicated for threads 1201a and 1201b. Some resources, such as re-order buffers in reorder/retirement unit 1235, ILTB 1220, load/store buffers, and queues may be shared through partitioning. Other resources, such as general purpose internal registers, page-table base register(s), low-level data-cache and data-TLB 1215, execution unit(s) 1240, and portions of out-of-order unit 1235 are potentially fully shared.

Processor 1200 often includes other resources, which may be fully shared, shared through partitioning, or dedicated by/to processing elements. In FIG. 12, an embodiment of a purely exemplary processor with illustrative logical units/resources of a processor is illustrated. Note that a processor may include, or omit, any of these functional units, as well as include any other known functional units, logic, or firmware not depicted. As illustrated, core 1201 includes a simplified, representative out-of-order (OOO) processor core. But an in-order processor may be utilized in different embodiments. The OOO core includes a branch target buffer 1220 to predict branches to be executed/taken and an instruction-translation buffer (I-TLB) 1220 to store address translation entries for instructions.

Core 1201 further includes decode module 1225 coupled to fetch unit 1220 to decode fetched elements. Fetch logic, in one embodiment, includes individual sequencers associated with thread slots 1201a, 1201b, respectively. Usually core 1201 is associated with a first ISA, which defines/specifies instructions executable on processor 1200. Often machine code instructions that are part of the first ISA include a portion of the instruction (referred to as an opcode), which references/specifies an instruction or operation to be performed. Decode logic 1225 includes circuitry that recognizes these instructions from their opcodes and passes the decoded instructions on in the pipeline for processing as defined by the first ISA. For example, as discussed in more detail below decoders 1225, in one embodiment, include logic designed or adapted to recognize specific instructions, such as transactional instruction. As a result of the recognition by decoders 1225, the architecture or core 1201 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1226, in one embodiment, recognize the same ISA (or a subset thereof). Alternatively, in a heterogeneous core environment, decoders 1226 recognize a second ISA (either a subset of the first ISA or a distinct ISA).

In one example, allocator and renamer block 1230 includes an allocator to reserve resources, such as register files to store instruction processing results. However, threads 1201*a* and 1201*b* are potentially capable of out-of-order execution, where allocator and renamer block 1230 also reserves other resources, such as reorder buffers to track instruction results. Unit 1230 may also include a register renamer to rename program/instruction reference registers to other registers internal to processor 1200. Reorder/retirement unit 1235 includes components, such as the reorder buffers mentioned above, load buffers, and store buffers, to support out-of-order execution and later in-order retirement of instructions executed out-of-order.

Scheduler and execution unit(s) block 1240, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1250 are coupled to execution unit(s) 1240. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1201 and 1202 share access to higher-level or further-out cache, such as a second level cache associated with on-chip interface 1210. Note that higher-level or further-out refers to cache levels increasing or getting further way from the execution unit(s). In one embodiment, higher-level cache is a last-level data cache—last cache in the memory hierarchy on processor 1200—such as a second or third level data cache. However, higher level cache is not so limited, as it may be associated with or include an instruction cache. A trace cache—a type of instruction cache—instead may be coupled after decoder 1225 to store recently decoded traces. Here, an instruction potentially refers to a macro-instruction (i.e. a general instruction recognized by the decoders), which may decode into a number of micro-instructions (micro-operations).

In the depicted configuration, processor 1200 also includes on-chip interface module 1210. Historically, a memory controller, which is described in more detail below, has been included in a computing system external to processor 1200. In this scenario, on-chip interface 1210 is to communicate with devices external to processor 1200, such as system memory 1275, a chipset (often including a memory controller hub to connect to memory 1275 and an I/O controller hub to connect peripheral devices), a memory controller hub, a northbridge, or other integrated circuit. And in this scenario, bus 1205 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1275 may be dedicated to processor 1200 or shared with other devices in a system. Common examples of types of memory 1275 include DRAM, SRAM, non-volatile memory (NV memory), and other known storage devices. Note that device 1280 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1200. For example in one embodiment, a memory controller hub is on the same package and/or die with processor 1200. Here, a portion of the core (an on-core portion) 1210 includes one or more controller(s) for interfacing with other devices such as memory 1275 or a graphics device 1280. The configuration including an interconnect and controllers for interfacing with such devices is often referred to as an on-core (or un-core configuration). As an example, on-chip interface 1210 includes a ring interconnect for on-chip communication and a high-speed serial point-to-point link 1205 for off-chip communication. Yet, in the SOC environment, even more devices, such as the network interface, co-processors, memory 1275, graphics processor 1280, and any other known computer devices/interface may be integrated on a single die or integrated circuit to provide small form factor with high functionality and low power consumption.

In one embodiment, processor 1200 is capable of executing a compiler, optimization, and/or translator code 1277 to compile, translate, and/or optimize application code 1276 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 13:
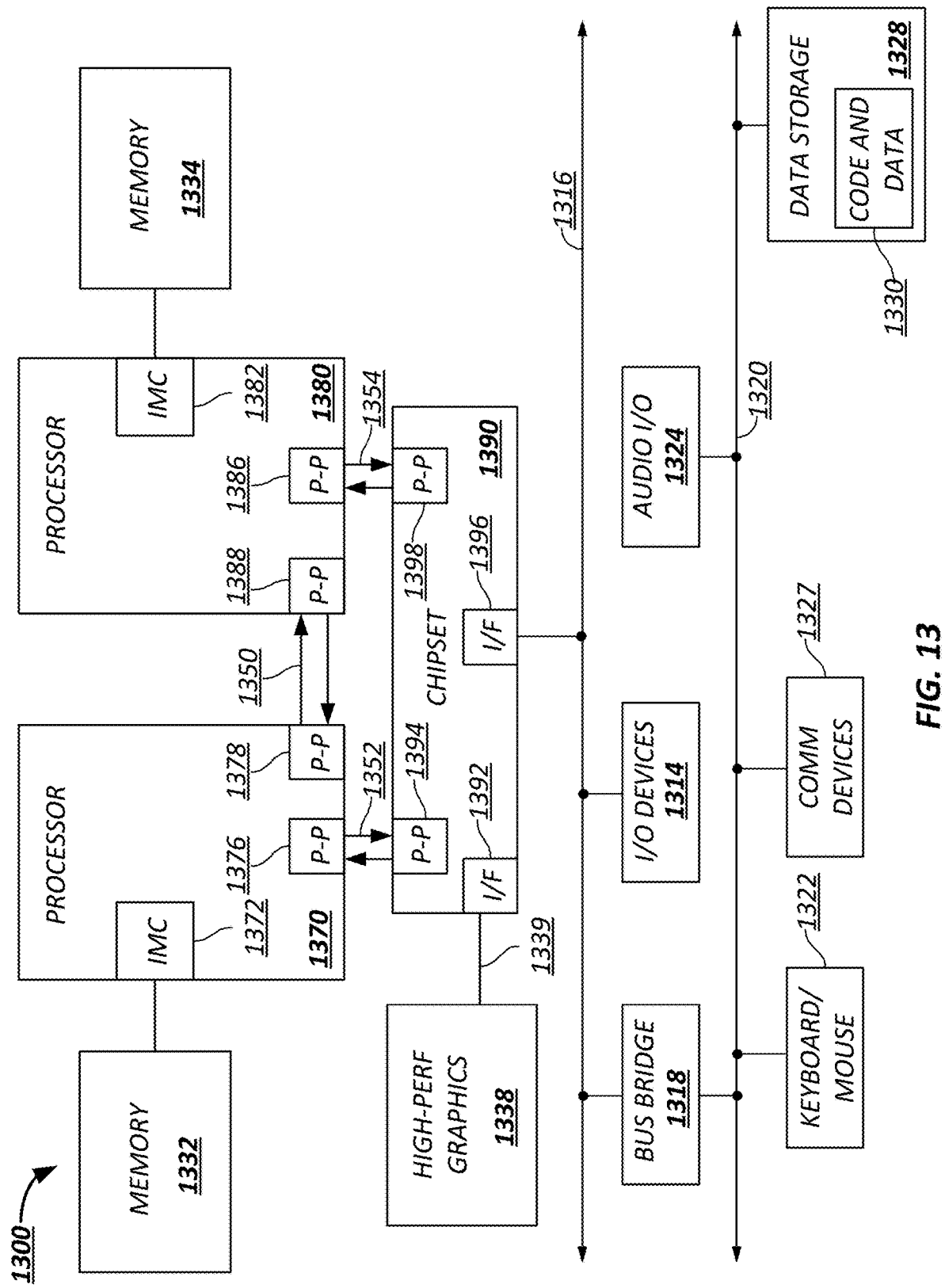
FIG. 13 illustrates an embodiment of a block for a computing system including multiple processors.

Referring now to FIG. 13, shown is a block diagram of a second system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of a processor. In one embodiment, 1352 and 1354 are part of a serial, point-to-point coherent interconnect fabric, such as a high-performance architecture. As a result, the solutions described herein may be implemented within a UPI or other architecture.

While shown with only two processors 1370, 1380, it is to be understood that the scope of the present disclosure is not so limited. In other embodiments, one or more additional processors may be present in a given processor.

Processors 1370 and 1380 are shown including integrated memory controller units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 each exchange information with a chipset 1390 via individual P-P interfaces 1352, 1354 using point to point interface circuits 1376, 1394, 1386, 1398. Chipset 1390 also exchanges information with a high-performance graphics circuit 1338 via an interface circuit 1392 along a high-performance graphics interconnect 1339.

A shared cache (not shown) may be included in either processor or outside of both processors; yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 are coupled to first bus 1316, along with a bus bridge 1318 which couples first bus 1316 to a second bus 1320. In one embodiment, second bus 1320 includes a low pin count (LPC) bus. Various devices are coupled to second bus 1320 including, for example, a keyboard and/or mouse 1322, communication devices 1327 and a storage unit 1328 such as a disk drive or other mass storage device which often includes instructions/code and data 1330, in one embodiment. Further, an audio I/O 1324 is shown coupled to second bus 1320. Note that other architectures are possible, where the included components and interconnect architectures vary. For example, instead of the point-to-point architecture of FIG. 13, a system may implement a multi-drop bus or other such architecture.

While the solutions discussed herein have been described with respect to a limited number of embodiments, those skilled in the art will appreciate numerous modifications and variations therefrom. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosures.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform example embodiments herein may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is a non-transitory machine-readable storage medium with instructions stored thereon, the instructions executable by a machine to cause the machine to: access a cluster remapping register stored in computer memory; determine, from the cluster remapping register, a mapping of a first integrated circuit block in a first chip to a first cluster identifier, where the first cluster identifier is different than an assigned cluster identifier for the first integrated circuity block; determine, from the cluster remapping register, a mapping of a second integrated circuit block in the first chip to a second cluster identifier from the cluster remapping register; identify a first interconnect link to couple the first integrated circuit block in the first chip to a third integrated circuit block in a second chip; identify a second interconnect link to couple the second integrated circuit block in the first chip to a fourth integrated circuit block in the second chip; and determine whether connections made by the first and second interconnect links match connections defined in the cluster remapping register.

Example 2 includes the subject matter of example 1, where the instructions are further executable to: identify a mapping of the third integrated circuit block to a third cluster identifier; identify a mapping of the fourth integrated circuit block to a fourth cluster identifier, where the cluster remapping register identifies the respective cluster identifiers of a first pair of integrated circuit blocks to be connected by the first interconnect link and further identifies the respective cluster identifiers of a second pair of integrated circuit blocks to be connected by the second interconnect link.

Example 3 includes the subject matter of example 2, where the instructions are further executable to: rewrite the remapping table based on a determination that connections made by the first and second interconnect links do not match connections defined in the cluster remapping register.

Example 4 includes the subject matter of example 3, where the determination that connections made by the first and second interconnect links do not match connections defined in the cluster remapping register is made during link training and the instructions are further executable to reattempt the link training based on rewritten values in the remapping table.

Example 5 includes the subject matter of any one of examples 2-4, where the instructions are further executable to automatically reset the first and second interconnect links based on a determination that connections made by the first and second interconnect links do not match connections defined in the cluster remapping register.

Example 6 includes the subject matter of any one of examples 1-5, where an affinity policy for the first and second interconnect links presumes that an integrated circuit block in the first chip connected to an integrated circuit block in the second chip will have matching cluster identifier values, and the value of the assigned cluster identifier does not match a value of a cluster identifier of the third integrated circuit block.

Example 7 includes the subject matter of any one of examples 1-6, where the instructions are further executable to allow data to be communicated on the first and second interconnect links based on a determination that the connections made by the first and second interconnect links match connections defined in the cluster remapping register, where the data includes transactions based on a cache coherency protocol.

Example 8 includes the subject matter of example 7, where the instructions are further executable to translate an address in a particular transaction associated with the first integrated circuit block based on the cluster remapping register.

Example 9 includes the subject matter of any one of examples 7-8, where the cache coherency protocol includes Ultra Path Interconnect (UPI).

Example 10 includes the subject matter of any one of examples 1-9, where a basic input-output system (BIOS) discovers connections made by the first and second interconnect links and the determination that connections made by the first and second interconnect links do not match connections defined in the cluster remapping register is based on the discovered connections.

Example 11 is a method including: accessing configuration information of a computing platform; writing values to a cluster remapping register based on the configuration information, where the values identify a first connection between a first integrated circuit block on a first socket of the computing platform and a second integrated circuit block on a second socket of the computing platform and further identify a second connection between a third integrated circuit block on the first socket and a fourth integrated circuit block on the second socket, where a cluster identifier for the first integrated circuit block is different from a cluster identifier for the second integrated circuit block; initiating system software after writing values to the cluster remapping register; discovering a topology of connections between the first socket and the second socket using the system software; determining whether the topology of connections includes the first connection and the second connection as defined in the cluster remapping register; and attempting to complete training of the first connection and the second connection when the topology of connections includes the first connection and the second connection.

Example 12 includes the subject matter of example 11, where an affinity policy for the computing platform presumes symmetric connections between integrated circuit blocks of the first socket and integrated circuit blocks of the second socket such that any integrated circuit block of the first socket connected with an integrated circuit block of the second socket will have a cluster identifier value matching that of the connected-to integrated circuit block of the second socket.

Example 13 includes the subject matter of any one of examples 11-12, further including in response to determining that the topology of connections does not include at least one of the first connection or the second connection as defined in the cluster remapping register: rewriting the configuration information to reflect connections as discovered in the topology of connections; resetting at least a portion of the computing platform; and reprogramming the cluster remapping table with values to reflect the connections defined in the rewritten configuration information.

Example 14 includes the subject matter of any one of examples 11-13, where at least a portion of the method is performed by a basic input-output system (BIOS) of the computing platform.

Example 15 includes the subject matter of any one of examples 11-14, where each of the first, second, third, and fourth integrated circuit blocks includes: a respective shared memory block to include a cache; a respective caching agent; and a respective home agent based on a cache coherent protocol, where the first and second connections are based on a cache coherent interconnect protocol.

Example 16 includes the subject matter of example 15, where the cache coherent interconnect protocol includes an Ultra Path Interconnect (UPI) protocol.

Example 17 includes the subject matter of any one of examples 15-16, where the first socket includes a first interconnect fabric to couple integrated circuit blocks on the first socket and the second socket includes a second interconnect fabric to couple the integrated circuit blocks on the second socket.

Example 18 includes the subject matter of any one of examples 15-17, where each of the first, second, third, and fourth integrated circuit blocks further includes a processor core and a memory controller block.

Example 19 includes the subject matter of any one of examples 11-18, where the computing platform includes a circuit board and the first and second sockets are mounted on the circuit board and the first and second connections are implemented on the circuit board.

Example 20 is a system comprising means to perform the method of any one of examples 11-19.

Example 21 is a system including: a first chip including a first plurality of integrated circuit blocks; a second chip including a second plurality of integrated circuit blocks and a cluster remapping table; a microcontroller to access configuration information to identify whether connections between the first plurality of integrated circuit blocks and the second plurality of integrated circuit blocks are symmetrical or asymmetrical and to identify a desired topology of the connections between the first plurality of integrated circuit blocks and the second plurality of integrated circuit blocks; and cause values to be written to the cluster remapping table to identify the desired topology; and system software executable to: discover an actual topology of connections between the first plurality of integrated circuit blocks and the second plurality of integrated circuit blocks; determine whether the actual topology matches the desired topology as described in the cluster remapping table; and cause the connections between the first plurality of integrated circuit blocks and the second plurality of integrated circuit blocks to be trained when the actual topology matches the desired topology as described in the cluster remapping table.

Example 22 includes the subject matter of example 21, where the system software is further to: rewrite the configuration information to identify the actual topology; and cause the first and second chips to be rebooted when the when the actual topology does not match the desired topology as described in the cluster remapping table, where the cluster remapping table is to be rewritten with values to identify the actual topology based on the rewritten configuration information after rebooting.

Example 23 includes the subject matter of any one of examples 21-22, where the system software includes a basic input-output system (BIOS).

Example 24 includes the subject matter of any one of examples 21-23, where each integrated circuit block in the first and second pluralities of integrated circuit blocks includes: a respective shared memory block to include a cache; a respective caching agent; and a respective home agent based on a cache coherent protocol, where connections between the first plurality of integrated circuit blocks and the second plurality of integrated circuit blocks are based on a cache coherent interconnect protocol.

Example 25 includes the subject matter of example 24, where the cache coherent interconnect protocol includes an Ultra Path Interconnect (UPI) protocol.

Example 26 includes the subject matter of any one of examples 24-25, where the first chip includes a first interconnect fabric to couple the first plurality of integrated circuit blocks and the second chip includes a second interconnect fabric to couple the second plurality of integrated circuit blocks.

Example 27 includes the subject matter of any one of examples 24-26, where each integrated circuit block in the first and second pluralities of integrated circuit blocks further includes a processor core and a memory controller block.

Example 28 includes the subject matter of any one of examples 21-27, where the first chip includes a first system of on chip (SoC) and the second chip includes a second (SoC).

Example 29 includes the subject matter of any one of examples 20-27, further including a board including a first socket to couple to the first chip and a second socket to couple to the second chip.

Example 30 includes the subject matter of any one of examples 21-29, where an affinity policy for connections between the first plurality of integrated circuit blocks and the second plurality of integrated circuit blocks presumes symmetric connections between integrated circuit blocks of the first chip and integrated circuit blocks of the second chip such that any integrated circuit block of the first chip connected with an integrated circuit block of the second chip will have a cluster identifier value matching that of the connected-to integrated circuit block of the second chip.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A non-transitory machine-readable storage medium with instructions stored thereon, the instructions executable by a machine to cause the machine to:
   access a cluster remapping register stored in computer memory;
   determine, from the cluster remapping register, a mapping of a first integrated circuit block in a first chip to a first cluster identifier, wherein the first cluster identifier is different than an assigned cluster identifier for the first integrated circuity block;
   determine, from the cluster remapping register, a mapping of a second integrated circuit block in the first chip to a second cluster identifier from the cluster remapping register;
   identify a first interconnect link to couple the first integrated circuit block in the first chip to a third integrated circuit block in a second chip;
   identify a second interconnect link to couple the second integrated circuit block in the first chip to a fourth integrated circuit block in the second chip; and
   determine whether connections made by the first and second interconnect links match connections defined in the cluster remapping register.

2. The storage medium of claim 1, wherein the instructions are further executable to:
   identify a mapping of the third integrated circuit block to a third cluster identifier;
   identify a mapping of the fourth integrated circuit block to a fourth cluster identifier,
   wherein the cluster remapping register identifies the respective cluster identifiers of a first pair of integrated circuit blocks to be connected by the first interconnect link and further identifies the respective cluster identifiers of a second pair of integrated circuit blocks to be connected by the second interconnect link.

3. The storage medium of claim 2, wherein the instructions are further executable to: rewrite the remapping table based on a determination that connections made by the first and second interconnect links do not match connections defined in the cluster remapping register.

4. The storage medium of claim 3, wherein the determination that connections made by the first and second interconnect links do not match connections defined in the cluster remapping register is made during link training and the instructions are further executable to reattempt the link training based on rewritten values in the remapping table.

5. The storage medium of claim 2, wherein the instructions are further executable to automatically reset the first and second interconnect links based on a determination that connections made by the first and second interconnect links do not match connections defined in the cluster remapping register.

6. The storage medium of claim 1, wherein an affinity policy for the first and second interconnect links presumes that an integrated circuit block in the first chip connected to an integrated circuit block in the second chip will have matching cluster identifier values, and the value of the assigned cluster identifier does not match a value of a cluster identifier of the third integrated circuit block.

7. The storage medium of claim 1, wherein the instructions are further executable to allow data to be communicated on the first and second interconnect links based on a determination that the connections made by the first and second interconnect links match connections defined in the cluster remapping register, wherein the data comprises transactions based on a cache coherency protocol.

8. The storage medium of claim 7, wherein the instructions are further executable to translate an address in a particular transaction associated with the first integrated circuit block based on the cluster remapping register.

9. The storage medium of claim 7, wherein the cache coherency protocol comprises Ultra Path Interconnect (UPI).

10. The storage medium of claim 1, wherein a basic input-output system (BIOS) discovers connections made by the first and second interconnect links and the determination that connections made by the first and second interconnect links do not match connections defined in the cluster remapping register is based on the discovered connections.

11. A method comprising:
accessing configuration information of a computing platform;
writing values to a cluster remapping register based on the configuration information, wherein the values identify a first connection between a first integrated circuit block on a first socket of the computing platform and a second integrated circuit block on a second socket of the computing platform and further identify a second connection between a third integrated circuit block on the first socket and a fourth integrated circuit block on the second socket, wherein a cluster identifier for the first integrated circuit block is different from a cluster identifier for the second integrated circuit block;
initiating system software after writing values to the cluster remapping register;
discovering a topology of connections between the first socket and the second socket using the system software;
determining whether the topology of connections comprises the first connection and the second connection as defined in the cluster remapping register; and
attempting to complete training of the first connection and the second connection when the topology of connections comprises the first connection and the second connection.

12. The method of claim 11, wherein an affinity policy for the computing platform presumes symmetric connections between integrated circuit blocks of the first socket and integrated circuit blocks of the second socket such that any integrated circuit block of the first socket connected with an integrated circuit block of the second socket will have a cluster identifier value matching that of the connected-to integrated circuit block of the second socket.

13. The method of claim 11, further comprising in response to determining that the topology of connections does not include at least one of the first connection or the second connection as defined in the cluster remapping register:
rewriting the configuration information to reflect connections as discovered in the topology of connections;
resetting at least a portion of the computing platform; and
reprogramming the cluster remapping table with values to reflect the connections defined in the rewritten configuration information.

14. A system comprising:
a first chip comprising a first plurality of integrated circuit blocks;
a second chip comprising a second plurality of integrated circuit blocks and a cluster remapping table;
a microcontroller to:
access configuration information to identify whether connections between the first plurality of integrated circuit blocks and the second plurality of integrated circuit blocks are symmetrical or asymmetrical and to identify a desired topology of the connections between the first plurality of integrated circuit blocks and the second plurality of integrated circuit blocks;
cause values to be written to the cluster remapping table to identify the desired topology; and
system software executable to:
discover an actual topology of connections between the first plurality of integrated circuit blocks and the second plurality of integrated circuit blocks; and
determine whether the actual topology matches the desired topology as described in the cluster remapping table; and
cause the connections between the first plurality of integrated circuit blocks and the second plurality of integrated circuit blocks to be trained when the actual topology matches the desired topology as described in the cluster remapping table.

15. The system of claim 14, wherein the system software is further to:
rewrite the configuration information to identify the actual topology; and
cause the first and second chips to be rebooted when the when the actual topology does not match the desired topology as described in the cluster remapping table, wherein the cluster remapping table is to be rewritten with values to identify the actual topology based on the rewritten configuration information after rebooting.

16. The system of claim 14, wherein the system software comprises a basic input-output system (BIOS).

17. The system of claim 14, wherein each integrated circuit block in the first and second pluralities of integrated circuit blocks comprise:
a respective shared memory block to comprise a cache;
a respective caching agent;
a respective home agent based on a cache coherent protocol, wherein connections between the first plurality of integrated circuit blocks and the second plurality of integrated circuit blocks are based on a cache coherent interconnect protocol.

18. The system of claim 17, wherein the first chip comprises a first interconnect fabric to couple the first plurality of integrated circuit blocks and the second chip comprises a second interconnect fabric to couple the second plurality of integrated circuit blocks.

19. The system of claim 14, wherein the first chip comprises a first system of on chip (SoC) and the second chip comprises a second (SoC).

20. The system of claim 14, further comprising a board comprising a first socket to couple to the first chip and a second socket to couple to the second chip.

* * * * *